US008430661B2

(12) United States Patent
Ness et al.

(10) Patent No.: US 8,430,661 B2
(45) **Date of Patent: *Apr. 30, 2013**

(54) CONCRETE BLOCK MOLD WITH MOVEABLE LINER

(75) Inventors: John T. Ness, Stillwater, MN (US); Jeffrey A. Ness, Oak Park Heights, MN (US)

(73) Assignee: Ness Inventions, Inc., St. Paul, MN (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/185,179

(22) Filed: Jul. 18, 2011

(65) Prior Publication Data

US 2012/0015067 A1 Jan. 19, 2012

Related U.S. Application Data

(63) Continuation of application No. 12/479,351, filed on Jun. 5, 2009, now Pat. No. 7,980,842.

(51) Int. Cl.
*B29C 33/02* (2006.01)
*B29C 43/52* (2006.01)

(52) U.S. Cl.
USPC ........... 425/193; 425/143; 425/195; 425/407; 425/452

(58) Field of Classification Search .................. 425/139, 425/143, 161, 162, 186, 193, 195, 253, 407, 425/413, 316, 441, 452, DIG. 246
See application file for complete search history.

(56) References Cited

U.S. PATENT DOCUMENTS

| | | | | |
|---|---|---|---|---|
| 770,677 | A * | 9/1904 | Cuatt | 249/75 |
| 786,251 | A * | 3/1905 | Dunham | 249/64 |
| 812,336 | A * | 2/1906 | Glatfelter | 249/155 |
| 816,613 | A * | 4/1906 | Silva et al. | 425/413 |
| 817,735 | A * | 4/1906 | Campbell | 425/413 |
| 1,301,892 | A * | 4/1919 | Alfsen | 425/61 |
| 2,304,660 | A | 12/1942 | Scott | |
| 2,526,198 | A | 10/1950 | Clanton | |
| 3,488,817 | A | 1/1970 | Katz | |
| 3,504,408 | A * | 4/1970 | Jones | 425/432 |
| 3,600,749 | A * | 8/1971 | Munk et al. | 425/193 |
| 3,694,128 | A | 9/1972 | Foxen | |
| 3,713,339 | A * | 1/1973 | Medlar | 425/170 |
| 4,025,022 | A * | 5/1977 | Theysohn et al. | 249/63 |

(Continued)

FOREIGN PATENT DOCUMENTS

| | | |
|---|---|---|
| DE | 308276 | 11/1916 |
| DE | 3400349 | 7/1985 |

(Continued)

OTHER PUBLICATIONS

International Search Report for Application No. PCT/US2004/021608, Feb. 24, 2005.

*Primary Examiner* — Yogendra Gupta
*Assistant Examiner* — Emmanuel S Luk
(74) *Attorney, Agent, or Firm* — Dicke, Billig & Czaja PLLC

(57) ABSTRACT

A mold assembly mold having a mold cavity formed by a plurality of liner plates, wherein at least one of the liner plates is moveable toward and away from an interior of the mold cavity, and a heater element contacting and heating the moveable liner plate.

16 Claims, 26 Drawing Sheets

U.S. PATENT DOCUMENTS

| | | | | |
|---|---|---|---|---|
| 4,063,866 | A | 12/1977 | Lurbiecki | |
| 4,437,641 | A * | 3/1984 | Stavitsky et al. | 249/79 |
| 4,645,447 | A * | 2/1987 | Sumitomo | 425/450.1 |
| 4,678,158 | A * | 7/1987 | Brock | 249/161 |
| 4,854,563 | A | 8/1989 | Toss | |
| 4,869,660 | A | 9/1989 | Ruckstuhl | |
| 4,944,907 | A * | 7/1990 | Davis, Jr. | 264/220 |
| 5,183,616 | A * | 2/1993 | Hedrick | 264/219 |
| 5,484,274 | A * | 1/1996 | Neu | 425/116 |
| 5,736,168 | A * | 4/1998 | Goyal et al. | 425/183 |
| 5,846,576 | A | 12/1998 | Braungardt et al. | |
| 6,349,522 | B1 | 2/2002 | Stevens | |
| 6,416,306 | B2 * | 7/2002 | Oono et al. | 425/112 |
| 6,470,762 | B1 | 10/2002 | Burkart | |
| 6,616,872 | B2 * | 9/2003 | Kamiguchi et al. | 264/40.1 |
| 6,767,000 | B2 * | 7/2004 | Heide | 249/205 |
| 7,695,268 | B2 * | 4/2010 | Klettenberg | 425/353 |
| 7,740,471 | B2 * | 6/2010 | Hoogland | 425/441 |
| 7,785,097 | B2 * | 8/2010 | Ness et al. | 425/441 |
| 7,980,842 | B2 * | 7/2011 | Ness et al. | 425/143 |
| 2003/0102583 | A1 * | 6/2003 | Hirota et al. | 264/2.7 |
| 2003/0126821 | A1 | 7/2003 | Scherer et al. | |
| 2005/0025853 | A1 | 2/2005 | Ness | |
| 2008/0258340 | A1 * | 10/2008 | Klettenberg | 264/293 |

FOREIGN PATENT DOCUMENTS

| | | |
|---|---|---|
| DE | 4140093 | 6/1993 |
| FR | 2343570 | 10/1977 |
| FR | 2357346 | 2/1978 |
| GB | 1381114 | 1/1975 |
| JP | 63029403 | 2/1988 |
| WO | 02051604 | 7/2002 |

* cited by examiner

CONCRETE BLOCK MOLD WITH MOVEABLE LINER

CROSS-REFERENCE TO RELATED APPLICATIONS

This application is continuation of U.S. patent application Ser. No. 12/479,351 (Publication No. 2009/0304838) filed on Jun. 5, 2009, which is a continuation-in-part of U.S. patent application Ser. No. 11/591,624 (Publication No. 2007/0104819) filed on Nov. 1, 2006, which is a divisional of U.S. Pat. No. 7,261,548 filed on Jun. 29, 2004, which is a continuation-in-part of U.S. Pat. No. 7,156,645 filed Jul. 29, 2003, each of which is incorporated by reference herein in its entirety.

THE FIELD OF THE INVENTION

The present invention relates to concrete block molds, and more particularly to a concrete block mold adapted for use with a concrete block machine and having at least one moveable liner.

BACKGROUND OF THE INVENTION

Concrete blocks, also referred to as concrete masonry units (CMU's), are typically manufactured by forming them into various shapes using a concrete block machine employing a mold frame assembled so as to form a mold box. A mold cavity having a negative of a desired shape of the block to be formed is provided within the mold box. A support board, or pallet, is moved via a conveyor system onto a pallet table. The pallet table is moved upward until the pallet contacts and forms a bottom of the mold box. The cavity is then filled with concrete by a moveable feedbox drawer.

As soon as the mold is filled with concrete, the feedbox drawer is moved back to a storage position and a plunger, or head shoe assembly, descends to form a top of the mold. The head shoe assembly is typically matched to the top outside surface of the mold cavity and is hydraulically or mechanically pressed down on the concrete. The head shoe assembly compresses the concrete to a desired pounds-per-square-inch (psi) rating and block dimension while simultaneously vibrating the mold along with the vibrating table, resulting in substantial compression and optimal distribution of the concrete throughout the mold cavity.

Because of the compression, the concrete reaches a level of hardness that permits immediate stripping of the finished block from the mold. To remove the finished block from the mold, the mold remains stationary while the shoe and pallet table, along with the corresponding pallet, are moved downward and force the block from the mold onto the pallet. As soon as the bottom edge of the head shoe assembly clears the bottom edge of the mold, the conveyor system moves the pallet with the finished block forward, and another pallet takes its place under the mold. The pallet table then raises the next pallet to form a bottom of the mold box for the next block, and the process is repeated.

For many types of CMU's (e.g., pavers, patio blocks, light weight blocks, cinder blocks, etc.), but for retaining wall blocks and architectural units in particular, it is desirable for at least one surface of the block to have a desired texture, such as a stone-like texture. One technique for creating a desired texture on the block surface is to provide a negative of a desired pattern or texture on the side walls of the mold. However, because of the way finished blocks are vertically ejected from the mold, any such pattern or texture would be stripped from the side walls unless they are moved away from the mold interior prior to the block being ejected.

One technique employed for moving the sidewalls of a mold involves the use of a cam mechanism to move the sidewalls of the mold inward and an opposing spring to push the sidewalls outward from the center of the mold. However, this technique applies an "active" force to the sidewall only when the sidewall is being moved inward and relies on the energy stored in the spring to move the sidewall outward. The energy stored in the spring may potentially be insufficient to retract the sidewall if the sidewall sticks to the concrete. Additionally, the cam mechanism can potentially be difficult to utilize within the limited confines of a concrete block machine.

A second technique involves using a piston to extend and retract the sidewall. However, a shaft of the piston shaft is coupled directly to the moveable sidewall and moves in-line with the direction of movement of the moveable sidewall. Thus, during compression of the concrete by the head shoe assembly, an enormous amount of pressure is exerted directly on the piston via the piston shaft. Consequently, a piston having a high psi rating is required to hold the sidewall in place during compression and vibration of the concrete. Additionally, the direct pressure on the piston shaft can potentially cause increased wear and shorten the expected life of the piston.

SUMMARY OF THE INVENTION

One embodiment provides a mold assembly mold assembly having a mold cavity formed by a plurality of liner plates, wherein at least one of the liner plates is moveable toward and away from an interior of the mold cavity, and a heater element contacting and heating the moveable liner plate.

DESCRIPTION OF THE PREFERRED EMBODIMENTS

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing,"etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
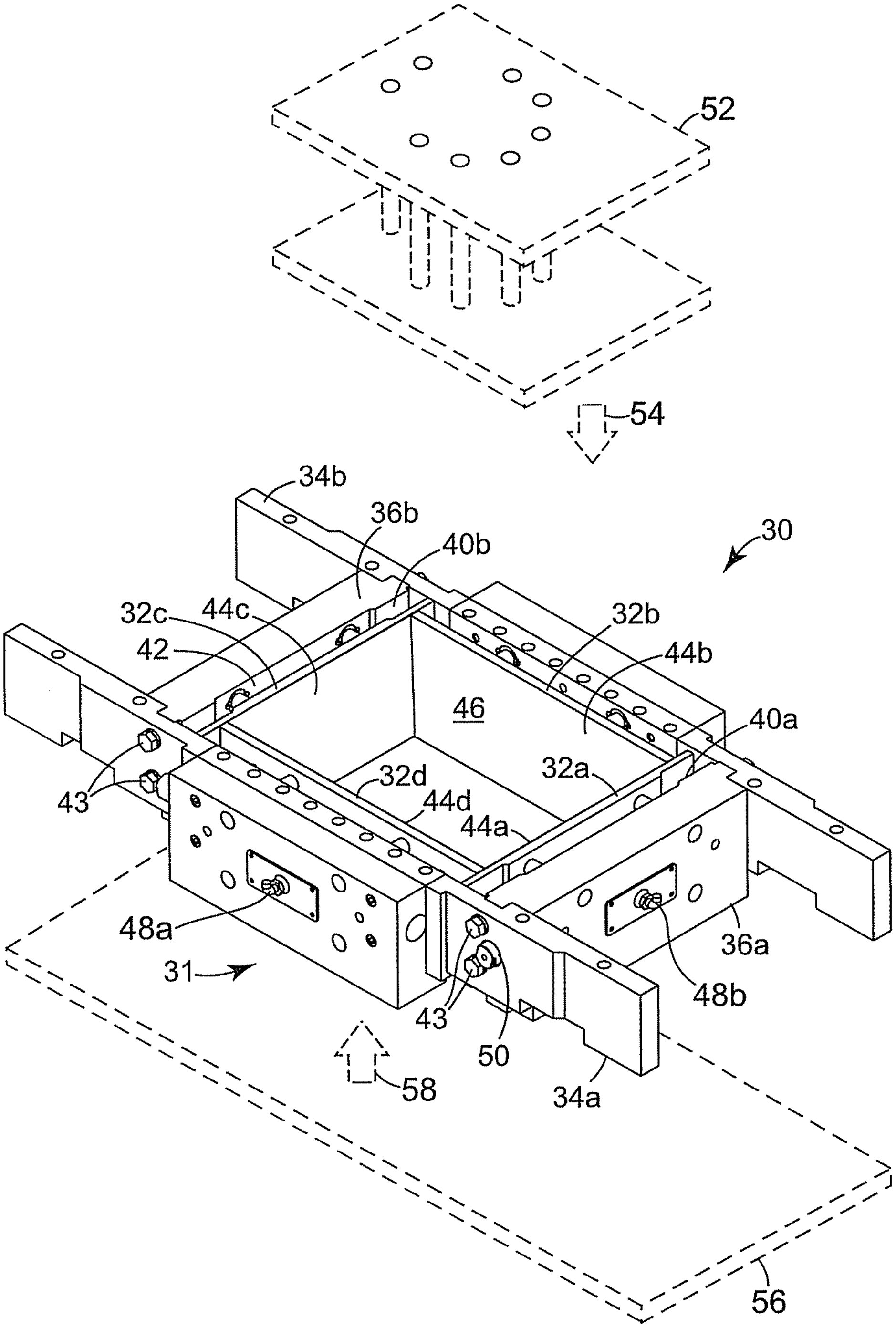
FIG. 1 is a perspective view of one exemplary embodiment of a mold assembly having moveable liner plates according to the present invention.

FIG. 1A is a perspective view of one exemplary embodiment of a mold assembly 30 having moveable liner plates 32*a*, 32*b*, 32*c* and 32*d* according to the present invention. Mold assembly 30 includes a drive system assembly 31 having side-members 34*a* and 34*b* and cross-members 36*a* and 36*b*, respectively having an inner wall 38*a*, 38*b*, 40*a*, and 40*b*, and coupled to one another such that the inner surfaces form a mold box 42. In the illustrated embodiment, cross members 36*a* and 36*b* are bolted to side members 34*a* and 34*b* with bolts 37.

Moveable liner plates 32*a*, 32*b*, 32*c*, and 32*d*, respectively have a front surface 44*a*, 44*b*, 44*c*, and 44*d* configured so as to form a mold cavity 46. In the illustrated embodiment, each liner plate has an associated gear drive assembly located internally to an adjacent mold frame member. A portion of a gear drive assembly 50 corresponding to liner plate 32*a* and located internally to cross-member 36*a* is shown extending through side-member 34*a*. Each gear drive assembly is selectively coupled to its associated liner plate and configured to move the liner plate toward the interior of mold cavity 46 by applying a first force in a first direction parallel to the associated cross-member, and to move the liner plate away from the interior of mold cavity 46 by applying a second force in a direction opposite the first direction. Side members 34*a* and 34*b* and cross-members 36*a* and 36*b* each have a corresponding lubrication port that extends into the member and provides lubrication to the corresponds gear elements. For example, lubrication ports 48*a* and 48*b*. The gear drive assembly and moveable liner plates according to the present invention are discussed in greater detail below.

In operation, mold assembly 30 is selectively coupled to a concrete block machine. For ease of illustrative purposes, however, the concrete block machine is not shown in FIG. 1. In one embodiment, mold assembly 30 is mounted to the concrete block machine by bolting side members 34*a* and 34*b* of drive system assembly 31 to the concrete block machine. In one embodiment, mold assembly 30 further includes a head shoe assembly 52 having dimensions substantially equal to those of mold cavity 46. Head shoe assembly 52 is also configured to selectively couple to the concrete block machine.

Liner plates 32*a* through 32*d* are first extended a desired distance toward the interior of mold box 42 to form the desired mold cavity 46. A vibrating table on which a pallet 56 is positioned is then raised (as indicated by directional arrow 58) such that pallet 56 contacts and forms a bottom to mold cavity 46. In one embodiment, a core bar assembly (not shown) is positioned within mold cavity 46 to create voids within the finished block in accordance with design requirements of a particular block.

Mold cavity 46 is then filled with concrete from a moveable feedbox drawer. Head shoe assembly 52 is then lowered (as indicated by directional arrow 54) onto mold 46 and hydraulically or mechanically presses the concrete. Head shoe assembly 52 along with the vibrating table then simultaneously vibrate mold assembly 30, resulting in a high compression of the concrete within mold cavity 46. The high level of compression fills any voids within mold cavity 46 and causes the concrete to quickly reach a level of hardness that permits immediate removal of the finished block from mold cavity 46.

The finished block is removed by first retracting liner plates 32*a* through 32*d*. Head shoe assembly 52 and the vibrating table, along with pallet 56, are then lowered (in a direction opposite to that indicated by arrow 58), while mold assembly 30 remains stationary so that head shoe assembly 56 pushes the finished block out of mold cavity 46 onto pallet 52. When a lower edge of head shoe assembly 52 drops below a lower edge of mold assembly 30, the conveyer system moves pallet 56 carrying the finished block away and a new pallet takes its place. The above process is repeated to create additional blocks.

By retracting liner plates 32*a* through 32*b* prior to removing the finished block from mold cavity 46 liner plates 32*a* through 32*d* experience less wear and, thus, have an increased operating life expectancy. Furthermore, moveable liner plates 32*a* through 32*d* also enables a concrete block to be molded in a vertical position relative to pallet 56, in lieu of the standard horizontal position, such that head shoe assembly 52 contacts what will be a "face" of the finished concrete block. A "face" is a surface of the block that will be potentially be exposed for viewing after installation in a wall or other structure.

Figure 2:
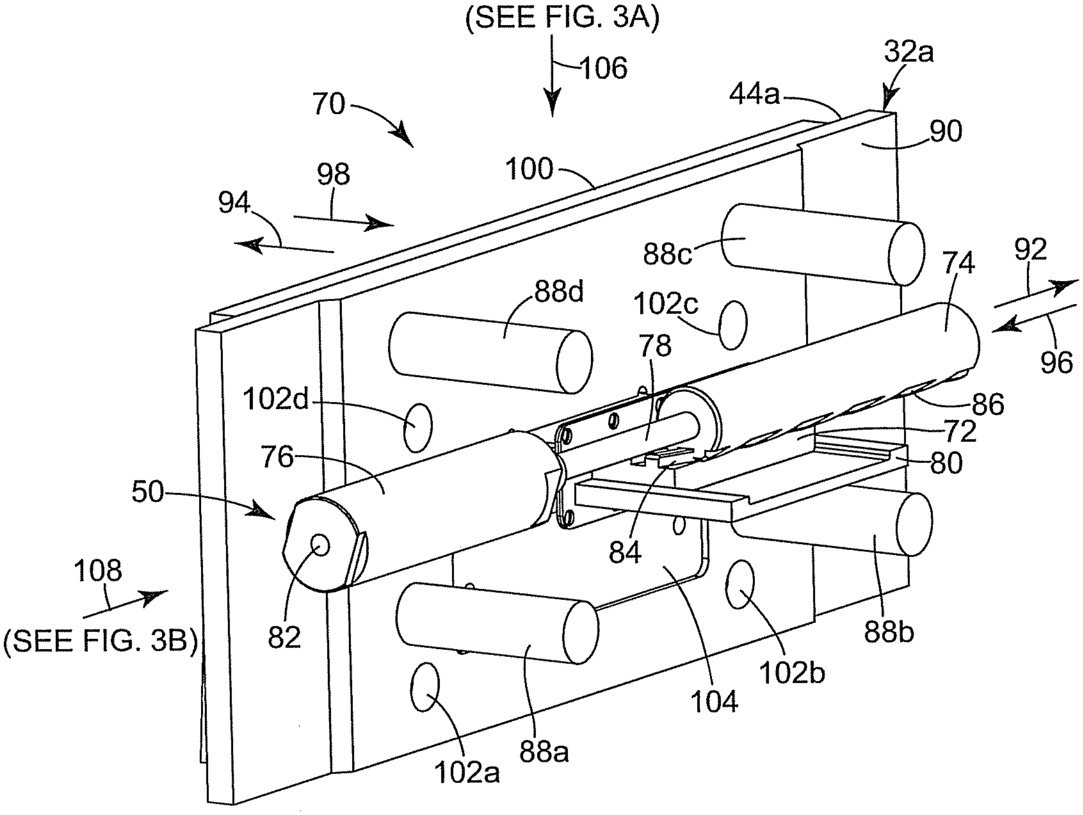
FIG. 2 is a perspective view of one exemplary embodiment of a gear drive assembly and moveable liner plate according to the present invention.

FIG. 2 is a perspective view 70 illustrating a moveable liner plate and corresponding gear drive assembly according to the present invention, such as moveable liner plate 32*a* and corresponding gear drive assembly 50. For illustrative purposes, side member 34*a* and cross-member 36 are not shown. Gear drive assembly 50 includes a first gear element 72 selectively coupled to liner plate 32*a*, a second gear element 74, a single rod-end double-acting pneumatic cylinder (cylinder) 76 coupled to second gear element 74 via a piston rod 78, and a gear track 80. Cylinder 76 includes an aperture 82 for accepting a pneumatic fitting. In one embodiment, cylinder 76 comprises a hydraulic cylinder. In one embodiment, cylinder 76 comprises a double rod-end dual-acting cylinder. In one embodiment, piston rod 78 is threadably coupled to second gear element 74.

In the embodiment of FIG. 2, first gear element 72 and second gear element 74 are illustrated and hereinafter referred to as a gear plate 72 and second gear element 74, respectively. However, while illustrated as a gear plate and a cylindrical gear head, first gear element 72 and second gear element 74 can be of any suitable shape and dimension.

Gear plate 72 includes a plurality of angled channels on a first major surface 84 and is configured to slide in gear track 80. Gear track 80 slidably inserts into a gear slot (not shown) extending into cross member 36*a* from inner wall 40*a*. Cylindrical gear head 74 includes a plurality of angled channels on a surface 86 adjacent to first major surface 84 of female gear plate 72, wherein the angled channels are tangential to a radius of cylindrical gear head 74 and configured to slidably mate and interlock with the angled channels of gear plate 72. Liner plate 32*a* includes guide posts 88*a*, 88*b*, 88*c*, and 88*d* extending from a rear surface 90. Each of the guide posts is configured to slidably insert into a corresponding guide hole (not shown) extending into cross member 36*a* from inner wall 40*a*. The gear slot and guide holes are discussed in greater detail below.

When cylinder 76 extends piston rod 78, cylindrical gear head 74 moves in a direction indicated by arrow 92 and, due to the interlocking angled channels, causes gear plate 72 and, thus, liner plate 32*a* to move toward the interior of mold 46 as indicated by arrow 94. It should be noted that, as illustrated, FIG. 2 depicts piston rod 78 and cylindrical gear head 74 in an extended position. When cylinder 76 retracts piston rod 78, cylindrical gear head 74 moves in a direction indicated by arrow 96 causing gear plate 72 and liner plate 32 to move away from the interior of the mold as indicated by arrow 98.

As liner plate 32*a* moves, either toward or away from the center of the mold, gear plate 72 slides in guide track 80 and guide posts 88*a* through 88*d* slide within their corresponding guide holes.

In one embodiment, a removable liner face 100 is selectively coupled to front surface 44*a* via fasteners 102*a*, 102*b*, 102*c*, and 102*d* extending through liner plate 32*a*. Removable liner face 100 is configured to provide a desired shape and/or provide a desired imprinted pattern, including text, on a block made in mold 46. In this regard, removable liner face 100 comprises a negative of the desired shape or pattern. In one embodiment, removable liner face 100 comprises a polyurethane material. In one embodiment, removable liner face 100 comprises a rubber material. In one embodiment, removable liner plate comprises a metal or metal alloy, such as steel or aluminum. In one embodiment, liner plate 32 further includes a heater mounted in a recess 104 on rear surface 90, wherein the heater aids in curing concrete within mold 46 to reduce the occurrence of concrete sticking to front surface 44*a* and removable liner face 100.

Figure 3A:
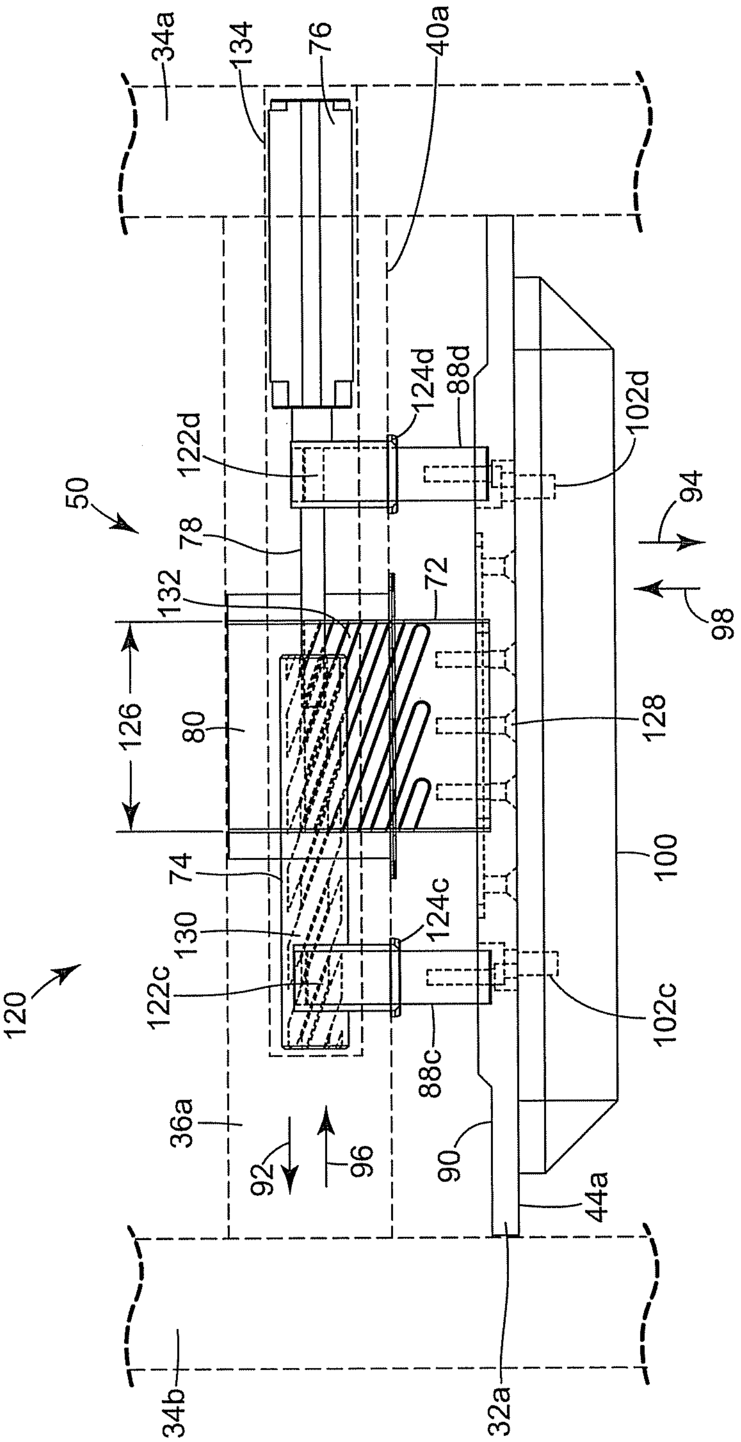
FIG. 3A is a top view of gear drive assembly and moveable liner plate as illustrated in FIG. 2.

FIG. 3A is a top view 120 of gear drive assembly 50 and liner plate 32*a*, as indicated by directional arrow 106 in FIG. 2. In the illustration, side members 34*a* and 34*b*, and cross member 36*a* are indicated dashed lines. Guide posts 88*c* and 88*d* are slidably inserted into guide holes 122*c* and 122*d*, respectively, which extend into cross member 36*a* from interior surface 40*a*. Guide holes 122*a* and 122*b*, corresponding respectively to guide posts 88*a* and 88*b*, are not shown but are located below and in-line with guide holes 122*c* and 122*d*. In one embodiment, guide hole bushings 124*c* and 124*d* are inserted into guide holes 122*c* and 122*d*, respectively, and slidably receive guide posts 88*c* and 88*d*. Guide hole bushings 124*a* and 124*b* are not shown, but are located below and in-line with guide hole bushings 124*c* and 124*d*. Gear track 80 is shown as being slidably inserted in a gear slot 126 extending through cross member 36*a* with gear plate 72 sliding in gear track 80. Gear plate 72 is indicated as being coupled to liner plate 32*a* by a plurality of fasteners 128 extending through liner plate 32*a* from front surface 44*a*.

A cylindrical gear shaft is indicated by dashed lines 134 as extending through side member 34*a* and into cross member 36*a* and intersecting, at least partially with gear slot 126. Cylindrical gear head 74, cylinder 76, and piston rod 78 are slidably inserted into gear shaft 134 with cylindrical gear head 74 being positioned over gear plate 72. The angled channels of cylindrical gear head 74 are shown as dashed lines 130 and are interlocking with the angled channels of gear plate 72 as indicated at 132.

Figure 3B:
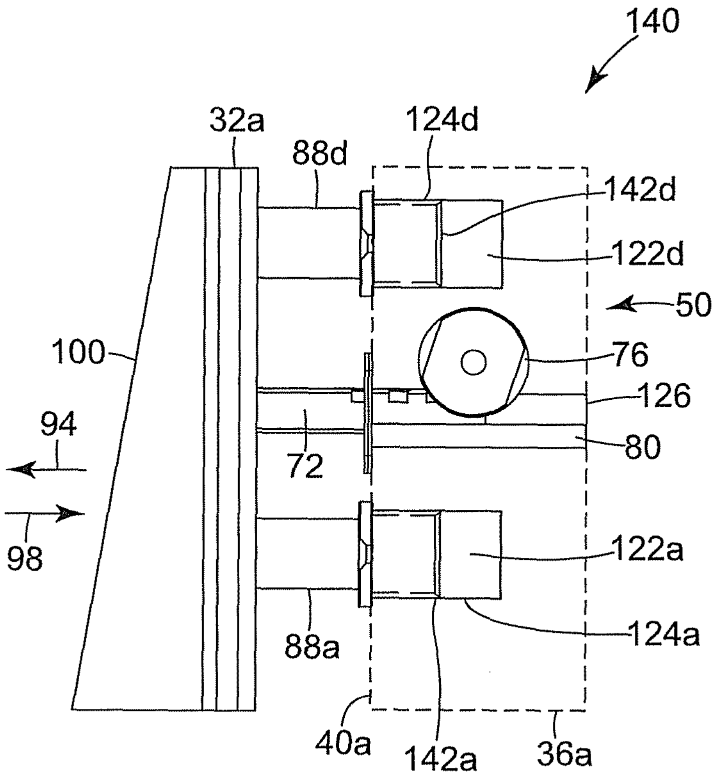
FIG. 3B is a side view of gear drive assembly and moveable liner plate as illustrated in FIG. 2.

FIG. 3B is a side view 140 of gear drive assembly 50 and liner plate 32*a*, as indicated by directional arrow 108 in FIG. 2. Liner plate 32*a* is indicated as being extended, at least partially, from cross member 36*a*. Correspondingly, guide posts 88*a* and 88*d* are indicated as partially extending from guide hole bushings 124*a* and 124*d*, respectively. In one embodiment, a pair of limit rings 142*a* and 142*d* are selectively coupled to guide posts 88*a* and 88, respectively, to limit an extension distance that liner plate 32*a* can be extended from cross member 36*a* toward the interior of mold cavity 46. Limit rings 142*b* and 142*c* corresponding respectively to guide posts 88*b* and 88*c* are not shown, but are located behind and in-line with limit rings 142*a* and 142*d*. In the illustrated embodiment, the limit rings are indicated as being substantially at an end of the guide posts, thus allowing a substantially maximum extension distance from cross member 36*a*. However, the limit rings can be placed at other locations along the guide posts to thereby adjust the allowable extension distance.

Figure 4B:
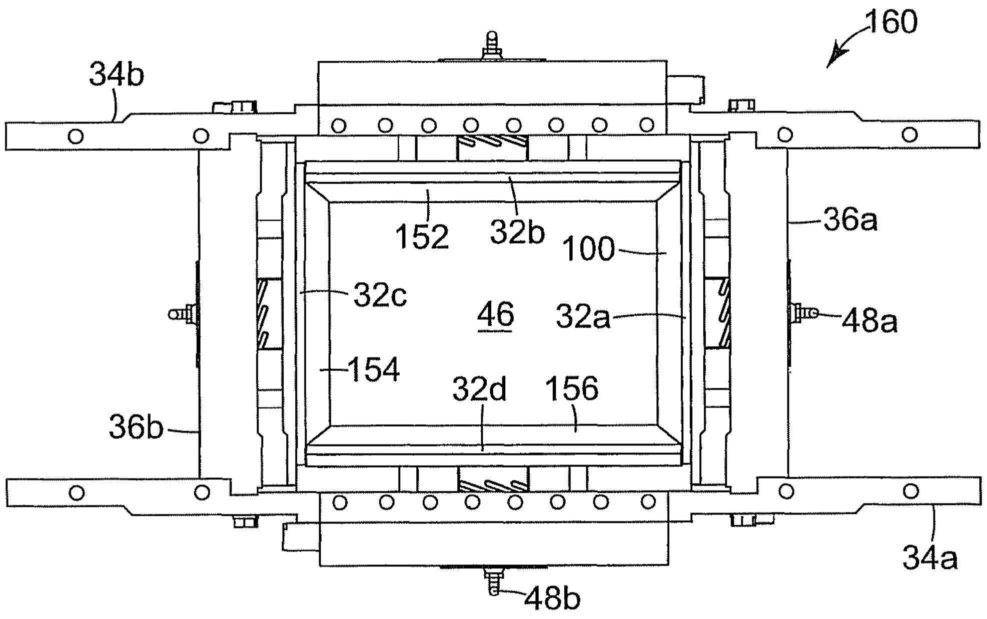
FIG. 4B is a top view of the mold assembly of FIG. 1 having the liner plates extended.
Figure 4A:
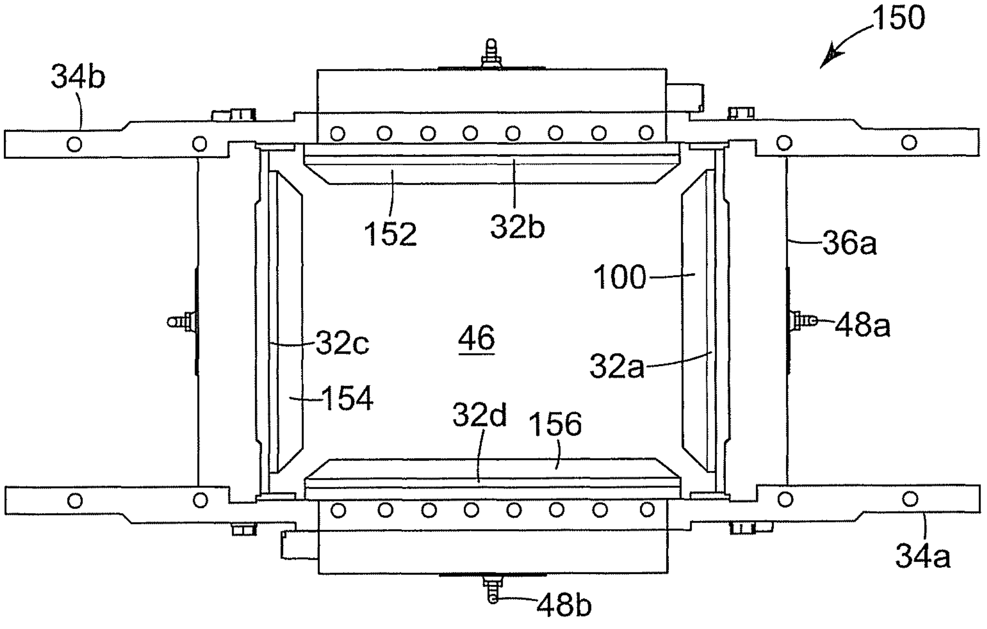
FIG. 4A is a top view of the mold assembly of FIG. 1 having the liner plates retracted.

FIG. 4A and FIG. 4B are top views 150 and 160, respectively, of mold assembly 30. FIG. 4A illustrates liner plates 32*a*, 32*b*, 32*c*, and 32*d* in a retracted positions. Liner faces 152, 154, and 154 correspond respectively to liner plates 32*b*, 32*c*, and 32*d*. FIG. 4B illustrates liner plates 32*a*, 32*b*, 32*c*, and 32*d*, along with their corresponding liner faces 100, 152, 154, and 156 in an extended position.

Figure 5A:
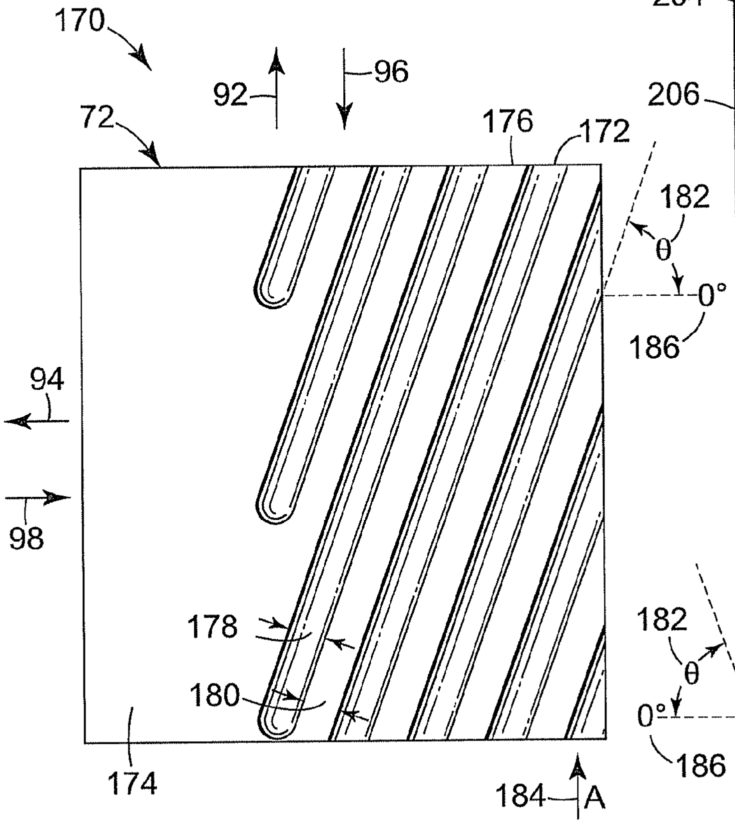
FIG. 5A illustrates a top view of one exemplary embodiment of a gear plate according to the present invention.

FIG. 5A is a top view 170 of gear plate 72. Gear plate 72 includes a plurality of angled channels 172 running across a top surface 174 of gear plate 72. Angled channels 172 form a corresponding plurality of linear "teeth" 176 having as a surface the top surface 174. Each angled channel 172 and each tooth 176 has a respective width 178 and 180. The angled channels run at an angle (Θ) 182 from 0°, indicated at 186, across gear plate 72.

Figure 5C:
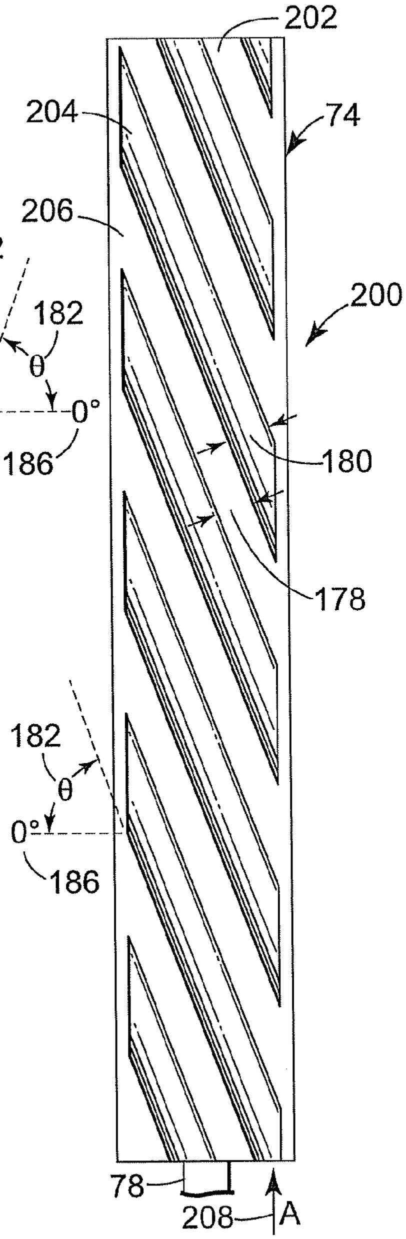
FIG. 5C illustrates a bottom view of one exemplary embodiment of a gear head according to the present invention.
Figure 5B:
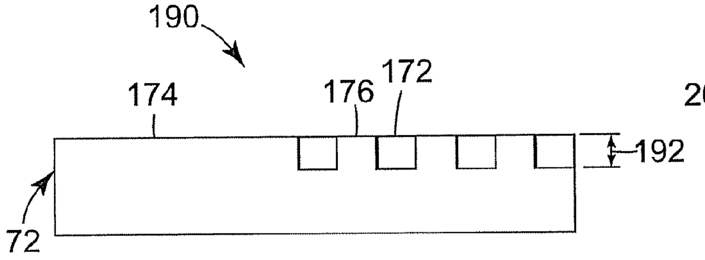
FIG. 5B illustrates an end view of the gear plate illustrated by FIG. 5A.

FIG. 5B is an end view ("A") 185 of gear plate 72, as indicated by directional arrow 184 in FIG. 5A, further illustrating the plurality of angled channels 172 and linear teeth 176. Each angled channel 172 has a depth 192.

FIG. 5C illustrates a view 200 of a flat surface 202 of cylindrical gear head 76. Cylindrical gear head 76 includes a plurality of angled channels 204 running across surface 202. Angled channels 204 form a corresponding plurality of linear teeth 206. The angled channels 204 and linear teeth 206 have widths 180 and 178, respectively, such that the width of linear teeth 206 substantially matches the width of angled channels 172 and the width of angled channels 204 substantially match the width of linear teeth 176. Angled channels 204 and teeth 206 run at angle (Θ) 182 from 0°, indicated at 186, across surface 202.

Figure 5D:
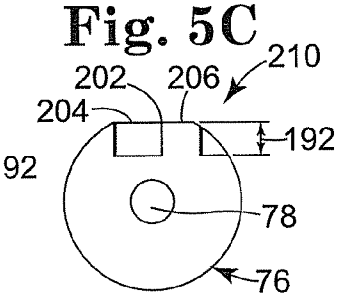
FIG. 5D illustrates an end view of the gear head of FIG. 5C.

FIG. 5D is an end view 210 of cylindrical gear head 76, as indicated by directional arrow 208 in FIG. 5C, further illustrating the plurality of angled channels 204 and linear teeth 206. Surface 202 is a flat surface tangential to a radius of cylindrical gear head 76. Each angled channel has a depth 192 from flat surface 202.

When cylindrical gear head 76 is "turned over" and placed across surface 174 of gear plate 72, linear teeth 206 of gear head 76 mate and interlock with angled channels 172 of gear plate 72, and linear teeth 176 of gear plate 72 mate and interlock with angled channels 204 of gear head 76 (See also FIG. 2). When gear head 76 is forced in direction 92, linear teeth 206 of gear head 76 push against linear teeth 176 of gear plate 72 and force gear plate 72 to move in direction 94. Conversely, when gear head 76 is forced in direction 96, linear teeth 206 of gear head 76 push against linear teeth 176 of gear plate 72 and force gear plate 72 to move in direction 98.

In order for cylindrical gear head 76 to force gear plate 72 in directions 94 and 98, angle (Θ) 182 must be greater than 0° and less than 90°. However, it is preferable that Θ 182 be at least greater than 45°. When Θ 182 is 45°or less, it takes more force for cylindrical gear head 74 moving in direction 92 to push gear plate 72 in direction 94 than it does for gear plate 72 being forced in direction 98 to push cylindrical gear head 74 in direction 96, such as when concrete in mold 46 is being compressed. The more Θ182 is increased above 45°, the greater the force that is required in direction 98 on gear plate 72 to move cylindrical gear head 74 in direction 96. In fact, at 90° gear plate 72 would be unable to move cylindrical gear head 74 in either direction 92 or 96, regardless of how much force was applied to gear plate 72 in direction 98. In effect, angle (Θ) acts as a multiplier to a force provided to cylindrical gear head 74 by cylinder 76 via piston rod 78. When Θ 182 is greater than 45°, an amount of force required to be applied to gear plate 72 in direction 98 in order to move cylindrical gear head 74 in direction 96 is greater than an amount of force required to be applied to cylindrical gear head 74 in direction 92 via piston rod 78 in order to "hold" gear plate 72 in position (i.e., when concrete is being compressed in mold 46).

However, the more Θ 182 is increased above 45°, the less distance gear plate 72, and thus corresponding liner plate 32*a*, will move in direction 94 when cylindrical gear head 74 is forced in direction 92. A preferred operational angle for Θ 182 is approximately 70°. This angle represents roughly a balance, or compromise, between the length of travel of gear plate 72 and an increase in the level of force required to be applied in direction 98 on gear plate 72 to force gear head 74 in direction 96. Gear plate 72 and cylindrical gear head 74 and their corresponding angled channels 176 and 206 reduce the required psi rating of cylinder 76 necessary to maintain the position of liner plate 32*a* when concrete is being compressed in mold cavity 46 and also reduces the wear experienced by cylinder 76. Additionally, from the above discussion, it is evident that one method for controlling the travel distance of liner plate 32*a* is to control the angle (Θ) 182 of the angled channels 176 and 206 respectively of gear plate 72 and cylindrical gear head 74.

Figure 6A:
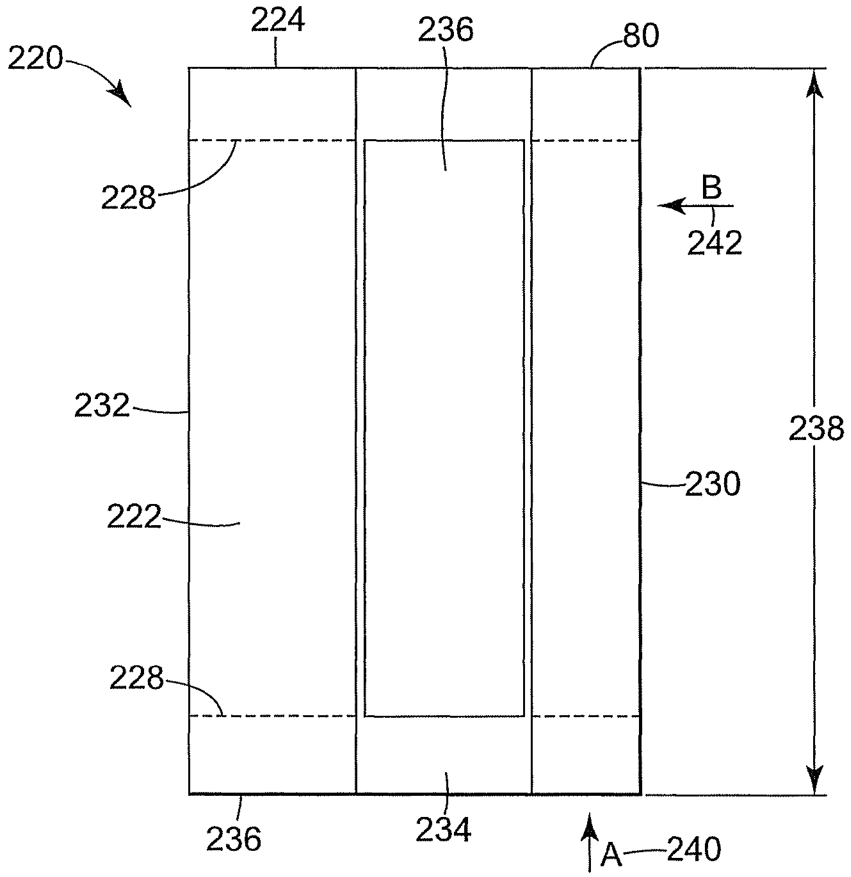
FIG. 6A is a top view of one exemplary embodiment of a gear track according to the present invention.

FIG. 6A is a top view 220 of gear track 80. Gear track 80 has a top surface 220, a first end surface 224, and a second end surface 226. A rectangular gear channel, indicated by dashed lines 228, having a first opening 230 and a second opening 232 extends through gear track 80. An arcuate channel 234, having a radius required to accommodate cylindrical gear head 76 extends across top surface 220 and forms a gear window 236 extending through top surface 222 into gear channel 228. Gear track 80 has a width 238 incrementally less than a width of gear opening 126 in side member 36*a* (see also FIG. 3A).

Figure 6B:
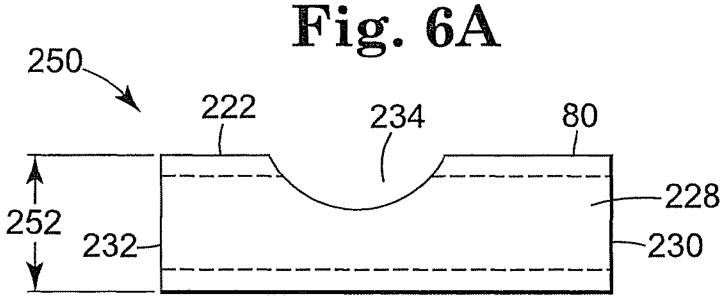
FIG. 6B is a side view of the gear track of FIG. 6A.
Figure 6C:
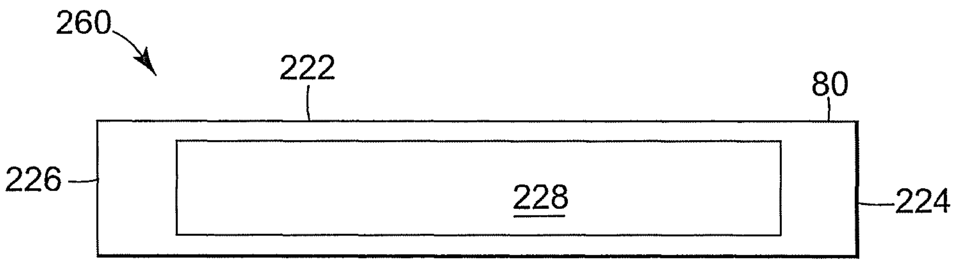
FIG. 6C is an end view of the gear track of FIG. 6A.

FIG. 6B is an end view 250 of gear track 80, as indicated by direction arrow 240 in FIG. 6A, further illustrating gear channel 228 and arcuate channel 234. Gear track 80 has a depth 252 incrementally less than height of gear opening 126 in side member 36*a* (see FIG. 3A). FIG. 6B is a side view 260 of gear track 80 as indicated by directional arrow 242 in FIG. 6A.

Figure 7:
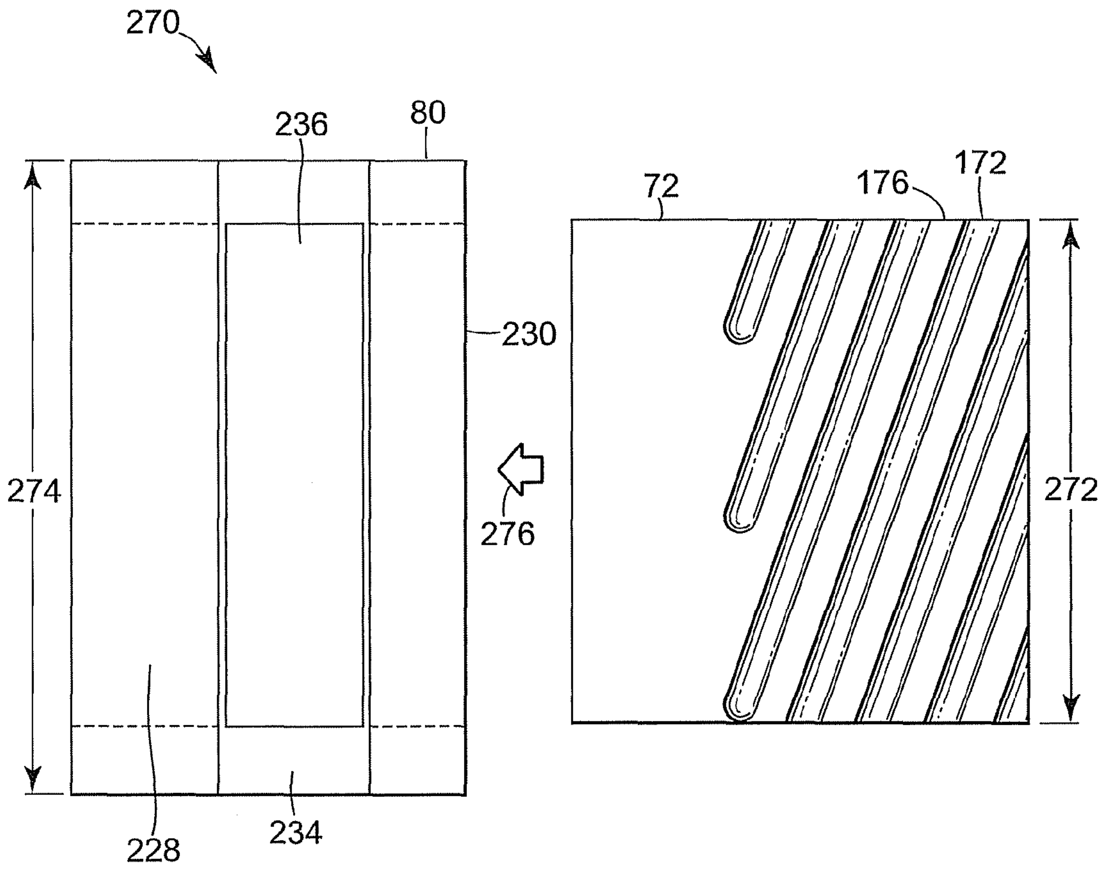
FIG. 7 is a diagram illustrating the relationship between a gear track and gear plate according to the present invention.

FIG. 7 is a top view 270 illustrating the relationship between gear track 80 and gear plate 72. Gear plate 72 has a width 272 incrementally less than a width 274 of gear track 80, such that gear plate 72 can be slidably inserted into gear channel 228 via first opening 230. When gear plate 72 is inserted within gear track 80, angled channels 172 and linear teeth 176 are exposed via gear window 236.

Figure 8A:
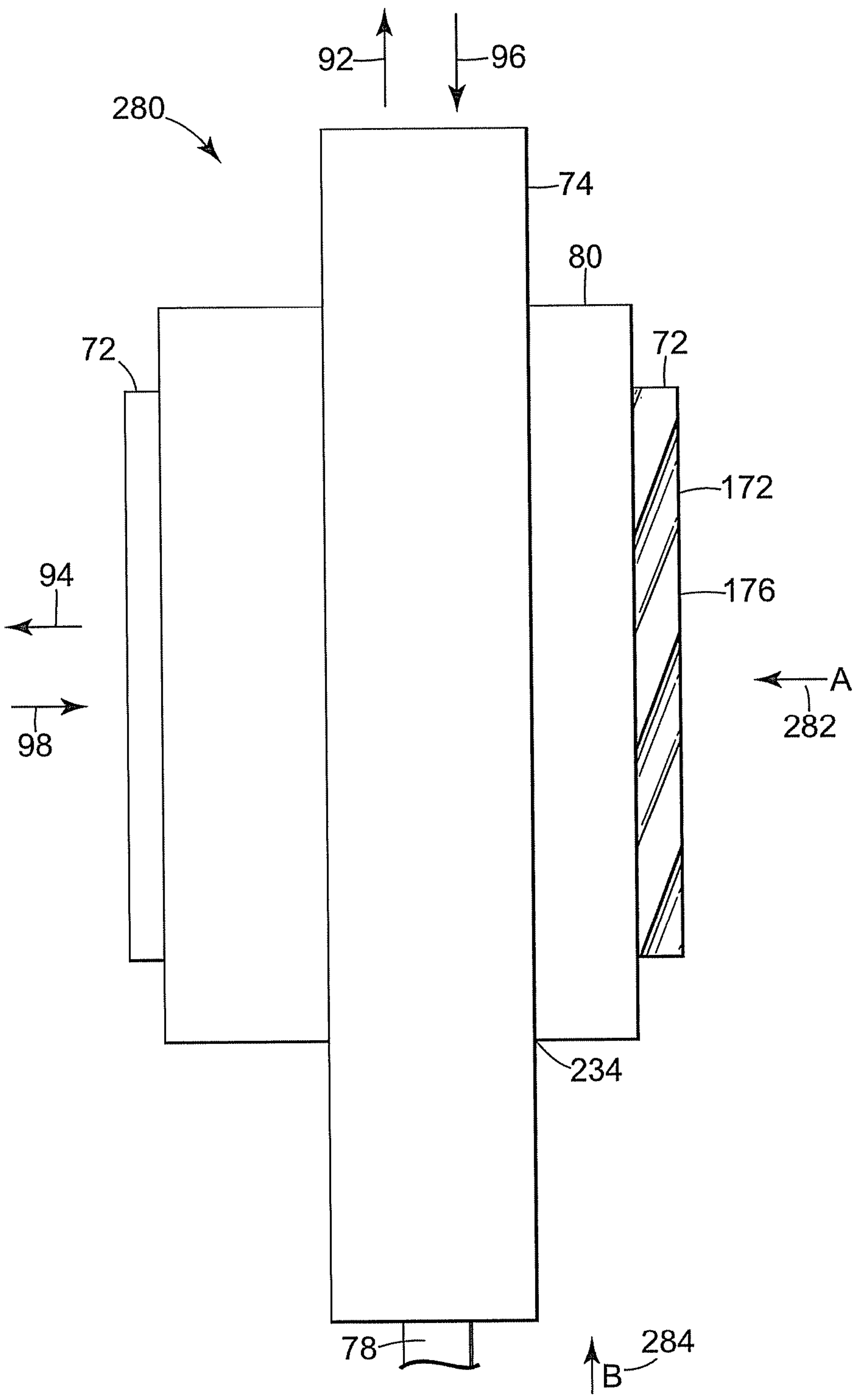
FIG. 8A is a top view illustrating the relationship between one exemplary embodiment of a gear head, gear plate, and gear track according to the present invention.

FIG. 8A is a top view 280 illustrating the relationship between gear plate 72, cylindrical gear head 74, and gear track 80. Gear plate 72 is indicated as being slidably inserted within guide track 80. Cylindrical gear head 74 is indicated as being positioned within arcuate channel 234, with the angled channels and linear teeth of cylindrical gear head 74 being slidably mated and interlocked with the angled channels 172 and linear teeth 176 of gear plate 72. When cylindrical gear head 74 is moved in direction 92 by extending piston rod 78, gear plate 72 extends outward from gear track 80 in direction 94 (See also FIG. 9B below). When cylindrical gear head 74 is moved in direction 96 by retracting piston rod 78, gear plate 72 retracts into gear track 80 in direction 98 (See also FIG. 9A below).

Figure 8B:
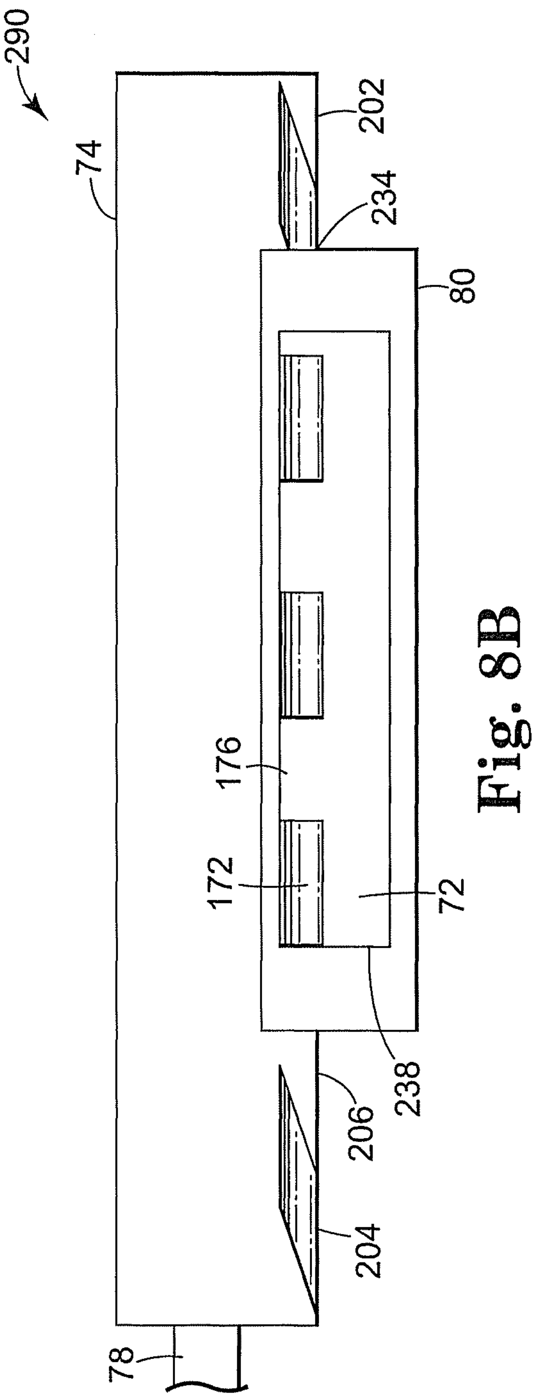
FIG. 8B is a side view of the illustration of FIG. 8A.
Figure 8C:
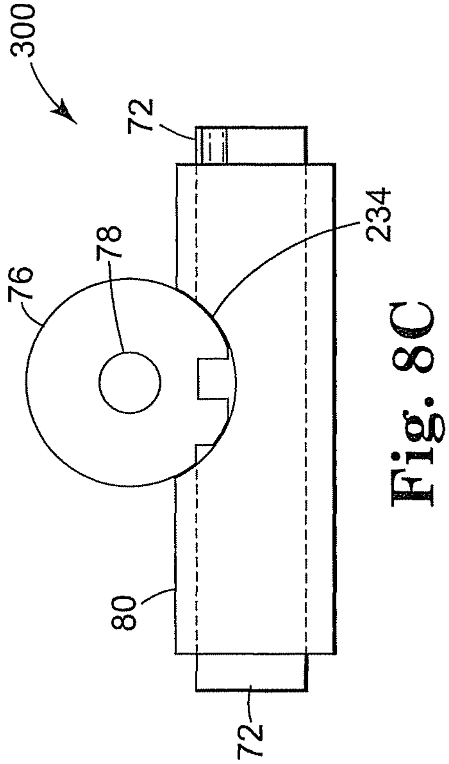
FIG. 8C is an end view of the illustration of FIG. 8A.

FIG. 8B is a side view 290 of gear plate 72, cylindrical gear head 74, and guide track 80 as indicated by directional arrow 282 in FIG. 8A. Cylindrical gear head 74 is positioned such that surface 202 is located within arcuate channel 234. Angled channels 204 and teeth 206 of cylindrical gear head 74 extend through gear window 236 and interlock with angled channels 172 and linear teeth 176 of gear plate 72 located within gear channel 228. FIG. 8C is an end view 300 as indicated by directional arrow 284 in FIG. 8A, and further illustrates the relationship between gear plate 72, cylindrical gear head 74, and guide track 80.

Figure 9A:
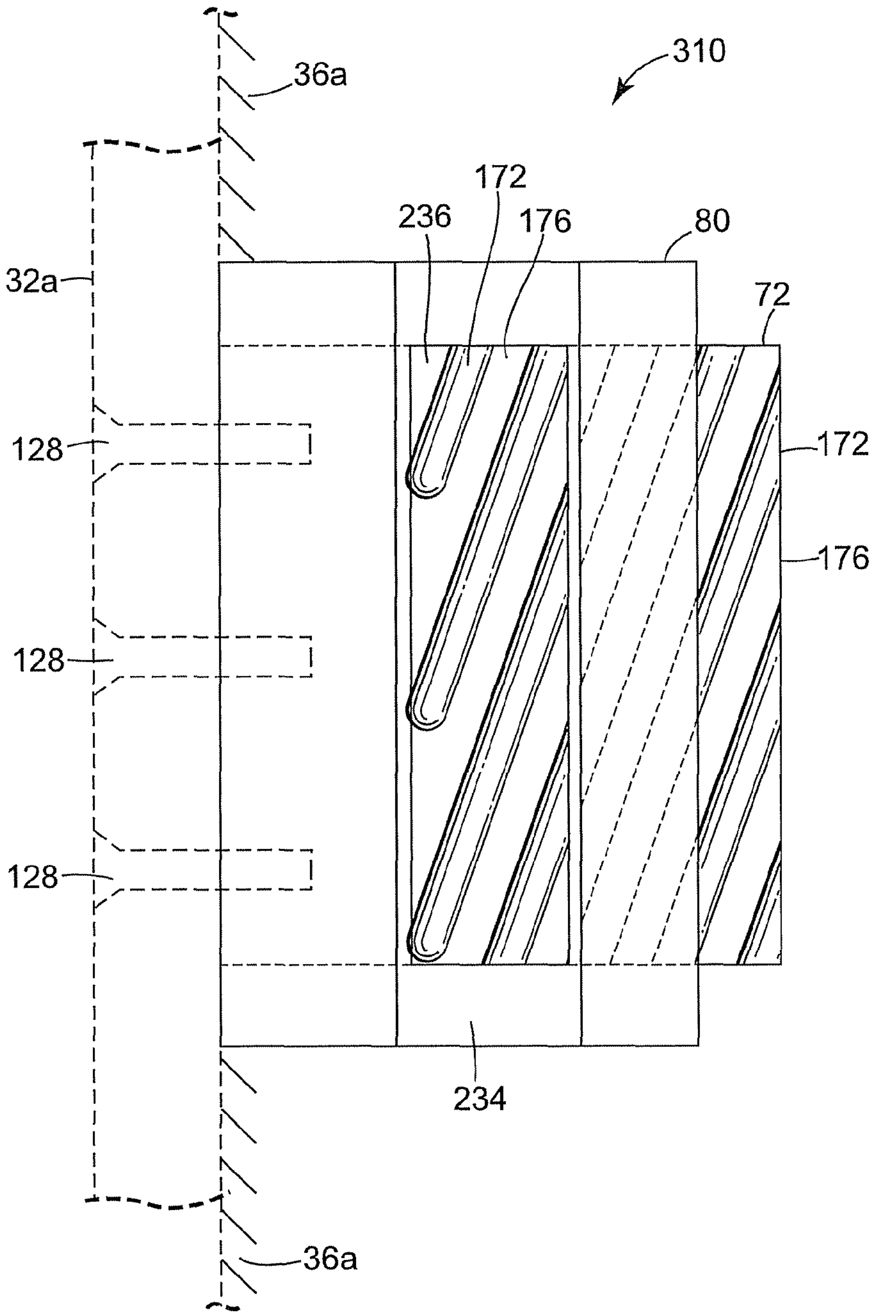
FIG. 9A is a top view illustrating one exemplary embodiment of a gear plate being in a retracted position within a gear track according to the present invention.

FIG. 9A is top view 310 illustrating gear plate 72 being in a fully retracted position within gear track 80, with liner plate 32*a* being retracted against cross member 36*a*. For purposes of clarity, cylindrical gear head 74 is not shown. Angled channels 172 and linear teeth 176 are visible through gear window 236. Liner plate 32*a* is indicated as being coupled to gear plate 72 with a plurality of fasteners 128 extending through liner plate 32*a* into gear plate 72. In one embodiment, fasteners 128 threadably couple liner plate 32*a* to gear plate 72.

Figure 9B:
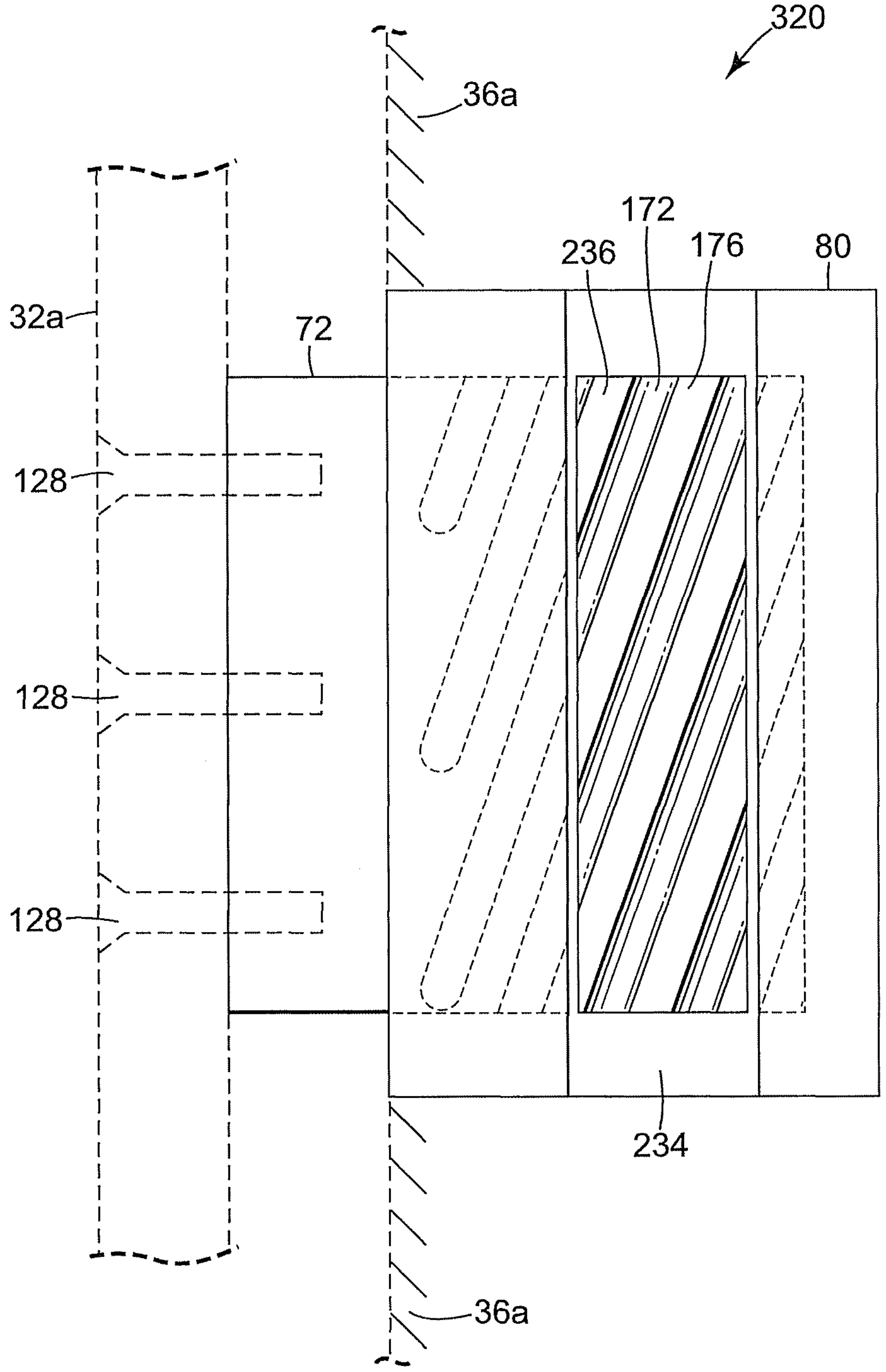
FIG. 9B is a top view illustrating one exemplary embodiment of a gear plate being in an extended position from a gear track according to the present invention.

FIG. 9B is a top view 320 illustrating gear plate 72 being extended, at least partially from gear track 80, with liner plate 32*a* being separated from cross member 36*a*. Again, cylindrical gear head 74 is not shown and angled channels 172 and linear teeth 176 are visible through gear window 236.

Figure 10A:
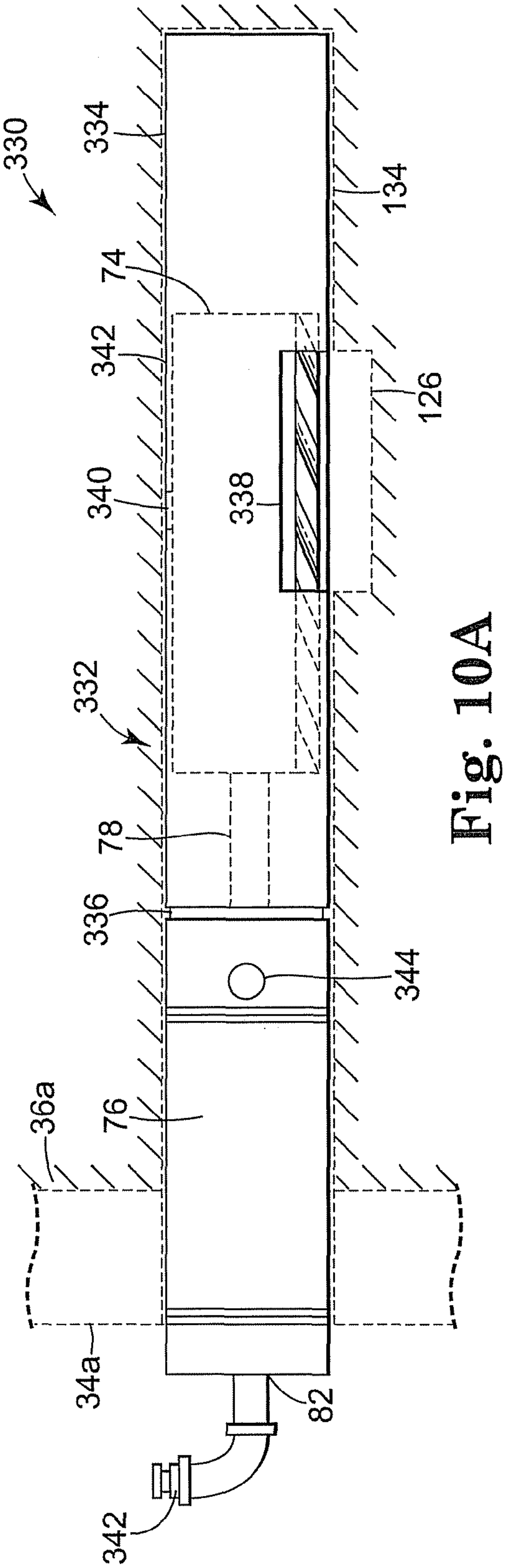
FIG. 10A is a diagram illustrating one exemplary embodiment of drive unit according to the present invention.

FIG. 10A is a diagram 330 illustrating one exemplary embodiment of a gear drive assembly 332 according to the present invention. Gear drive assembly 332 includes cylindrical gear head 74, cylinder 76, piston rod 78, and a cylindrical sleeve 334. Cylindrical gear head 74 and piston rod 78 are configured to slidably insert into cylindrical sleeve 334. Cylinder 76 is threadably coupled to cylindrical sleeve 334 with an O-ring 336 making a seal. A window 338 along an axis of cylindrical sleeve 334 partially exposes angled channels 204 and linear teeth 206. A fitting 342, such as a pneumatic or hydraulic fitting, is indicated as being threadably coupled to aperture 82. Cylinder 76 further includes an aperture 344, which is accessible through cross member 36*a*.

Gear drive assembly 332 is configured to slidably insert into cylindrical gear shaft 134 (indicated by dashed lines) so that window 338 intersects with gear slot 126 so that angled channels 204 and linear teeth 206 are exposed within gear slot 126. Gear track 80 and gear plate 72 (not shown) are first slidably inserted into gear slot 126, such that when gear drive assembly 332 is slidably inserted into cylindrical gear shaft 134 the angled channels 204 and linear teeth 206 of cylindrical gear head 74 slidably mate and interlock with the angled channels 172 and linear teeth 176 of gear plate 72.

Figure 10B:
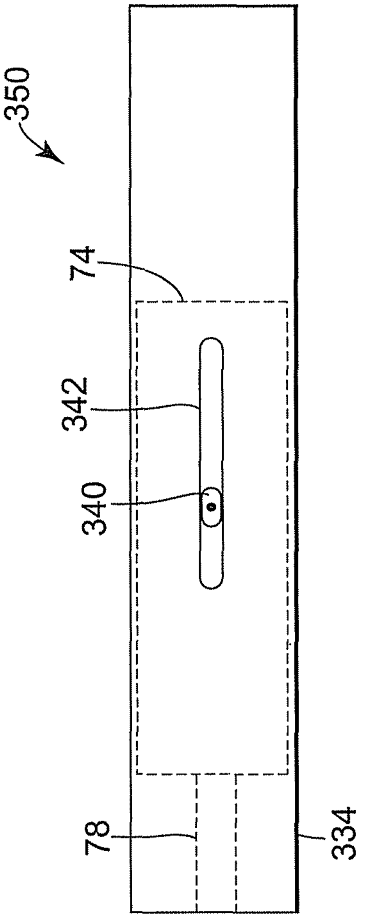
FIG. 10B is a partial top view of the drive unit of the illustration of FIG. 10A.

In one embodiment, a key 340 is coupled to cylindrical gear head 74 and rides in a key slot 342 in cylindrical sleeve 334. Key 340 prevents cylindrical gear head 74 from rotating within cylindrical sleeve 334. Key 340 and key slot 342 together also control the maximum extension and retraction of cylindrical gear head 74 within cylindrical sleeve 334. Thus, in one embodiment, key 340 can be adjusted to control the extension distance of liner plate 32*a* toward the interior of mold cavity 46. FIG. 10A is a top view 350 of cylindrical shaft 334 as illustrated in FIG. 10B, and further illustrates key 340 and key slot 342.

Figure 11A:
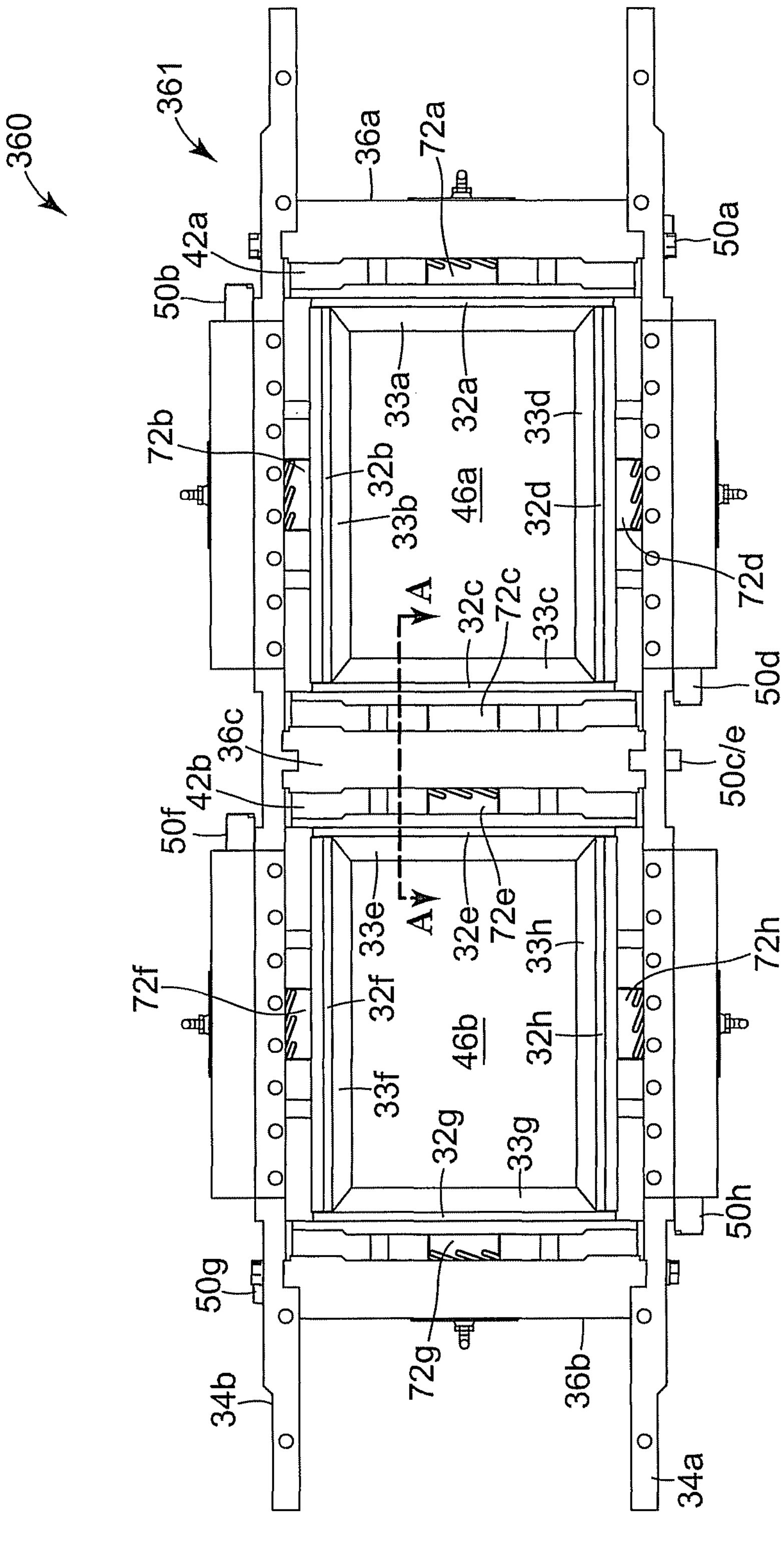
FIG. 11A is a top view illustrating one exemplary embodiment of a mold assembly according to the present invention.

FIG. 11A is a top view illustrating one exemplary embodiment of a mold assembly 360 according to the present invention for forming two concrete blocks. Mold assembly 360 includes a mold frame 361 having side members 34*a* and 34*b* and cross members 36*a* through 36*c* coupled to one another so as to form a pair of mold boxes 42*a* and 42*b*. Mold box 42*a* includes moveable liner plates 32*a* through 32*d* and corresponding removable liner faces 33*a* through 33*d* configured to form a mold cavity 46*a*. Mold box 42*b* includes moveable liner plates 32*e* through 32*h* and corresponding removable liner faces 33*e* through 33*h* configured to form a mold cavity 46*b*.

Each moveable liner plate has an associated gear drive assembly located internally to an adjacent mold frame member as indicated by 50*a* through 50*h*. Each moveable liner plate is illustrated in an extended position with a corresponding gear plate indicated by 72*a* through 72*h*. As described below, moveable liner plates 32*c* and 32*e* share gear drive assembly 50*c/e*, with gear plate 72*e* having its corresponding plurality of angled channels facing upward and gear plate 72*c* having its corresponding plurality of angled channels facing downward.

Figure 11B:
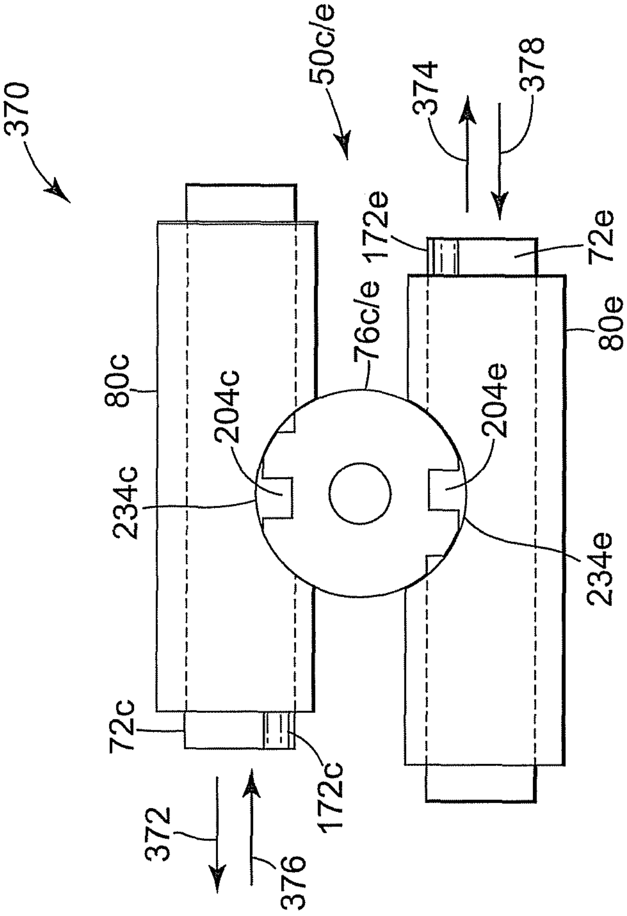
FIG. 11B is a diagram illustrating one exemplary embodiment of a gear drive assembly according to the present invention.

FIG. 11B is diagram illustrating a gear drive assembly according to the present invention, such as gear drive assembly 50*c/e*. FIG. 11B illustrates a view of gear drive assembly 50*c/e* as viewed from section A-A through cross-member 36*c* of FIG. 11A. Gear drive assembly 50*c/e* includes a single cylindrical gear head 76*c/e* having angled channels 204*c* and 204*e* on opposing surfaces. Cylindrical gear head 76*c/e* fits into arcuate channels 234*c* and 234*e* of gear tracks 80*c* and 80*d*, such that angled channels 204*c* and 204*e* slidably interlock with angled channels 172*c* and 172*e* of gear plates 72*c* and 72*e* respectively.

Angled channels 172*c* and 204*c*, and 172*e* and 204*e* oppose one another and are configured such that when cylindrical gear head 76*c/e* is extended (e.g. out from FIG. 11B) gear plate 72*c* moves in a direction 372 toward the interior of mold cavity 46*a* and gear plate 72*e* moves in a direction 374 toward the interior of mold cavity 46*b*. Similarly, when cylindrical gear head 76*c/e* is retracted (e.g. into FIG. 11B) gear plate 72*c* moves in a direction 376 away from the interior of mold cavity 46*a* and gear plate 72*e* moves in a direction 378 away from the interior of mold cavity 378. Again, cylindrical gear head 76*c/e* and gear plates 72*c* and 72*c* could be of any suitable shape.

Figure 12:
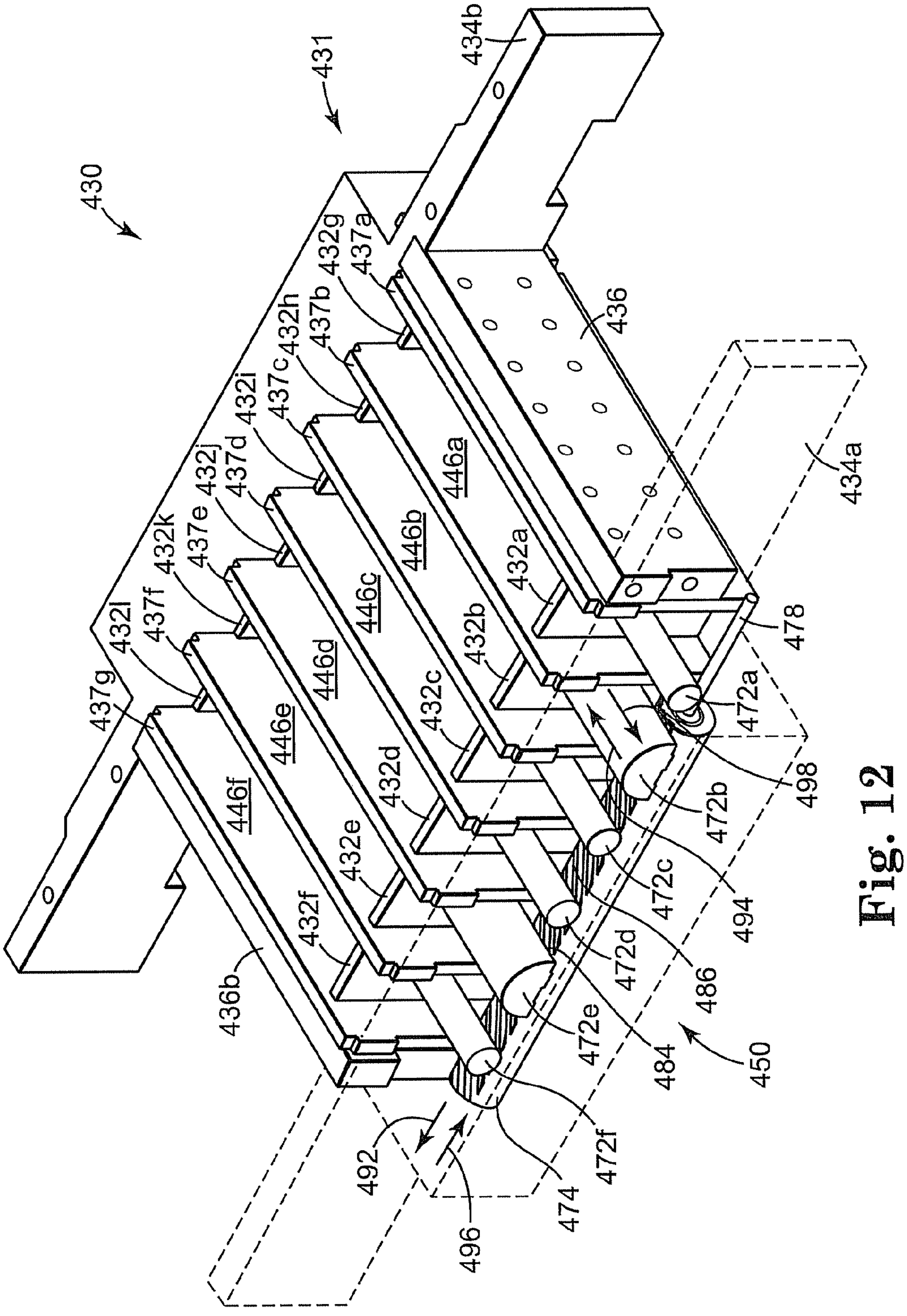
FIG. 12 is a perspective view illustrating a portion of one exemplary embodiment of a mold assembly according to the present invention.

FIG. 12 is a perspective view illustrating a portion of one exemplary embodiment of a mold assembly 430 according to the present invention. Mold assembly includes moveable liner plates 432*a* through 432*l* for simultaneously molding multiple concrete blocks. Mold assembly 430 includes a drive system assembly 431 having a side members 434*a* and 434*b*, and cross members 436*a* and 436*b*. For illustrative purposes, side member 434*a* is indicated by dashed lines. Mold assembly 430 further includes division plates 437*a* through 437*g*.

Together, moveable liner plates 432*a* through 432*l* and division plates 437*a* through 437*g* form mold cavities 446*a* through 446*f*, with each mold cavity configured to form a concrete block. Thus, in the illustrated embodiment, mold assembly 430 is configured to simultaneously form six blocks. However, it should be apparent from the illustration that mold assembly 430 can be easily modified for simultaneously forming quantities of concrete blocks other than six.

In the illustrated embodiment, side members 434*a* and 434*b* each have a corresponding gear drive assembly for moving moveable liner plates 432*a* through 432*f* and 432*g* through 432*l*, respectively. For illustrative purposes, only gear drive assembly 450 associated with side member 434*a* and corresponding moveable liner plates 432*a* through 432*g* is shown. Gear drive assembly 450 includes first gear elements 472*a* through 472*f* selectively coupled to corresponding moveable liner plates 432*a* through 432*f*, respectively, and a second gear element 474. In the illustrated embodiment, first gear elements 472*a* through 472*f* and second gear element 474 are shown as being cylindrical in shape. However, any suitable shape can be employed.

Second gear element 474 is selectively coupled to a cylinder-piston (not shown) via a piston rod 478. In one embodiment, which is described in greater detail below (see FIG. 12), second gear element 474 is integral with the cylinder-piston so as to form a single component.

In the illustrated embodiment, each first gear element 472*a* through 472*b* further includes a plurality of substantially parallel angled channels 484 that slidably mesh and interlock with a plurality of substantially parallel angled channels 486 on second gear element 474. When second gear element 474 is moved in a direction indicated by arrow 492, each of the moveable liner plates 432*a* through 432*f* moves in a direction indicated by arrow 494. Similarly, when second gear element 474 is move in a direction indicated by arrow 496, each of the moveable liner plates 432*a* through 432*f* moves in a direction indicated by arrow 498.

In the illustrated embodiment, the angled channels 484 on each of the first gear elements 432*a* through 432*f* and the angled channels 486 are at a same angle. Thus, when second gear element 474 moves in direction 492 and 496, each moveable liner plate 432*a* through 432*f* moves a same distance in direction 494 and 498, respectively. In one embodiment, second gear element 474 includes a plurality of groups of substantially parallel angled channels with each group corresponding to a different one of the first gear elements 472*a* through 472*f*. In one embodiment, the angled channels of each group and its corresponding first gear element have a different angle such that each moveable liner plate 432*a* through 432*f* move a different distance in directions 494 and 498 in response to second gear element 474 being moved in direction 492 and 496, respectively.

Figure 13:
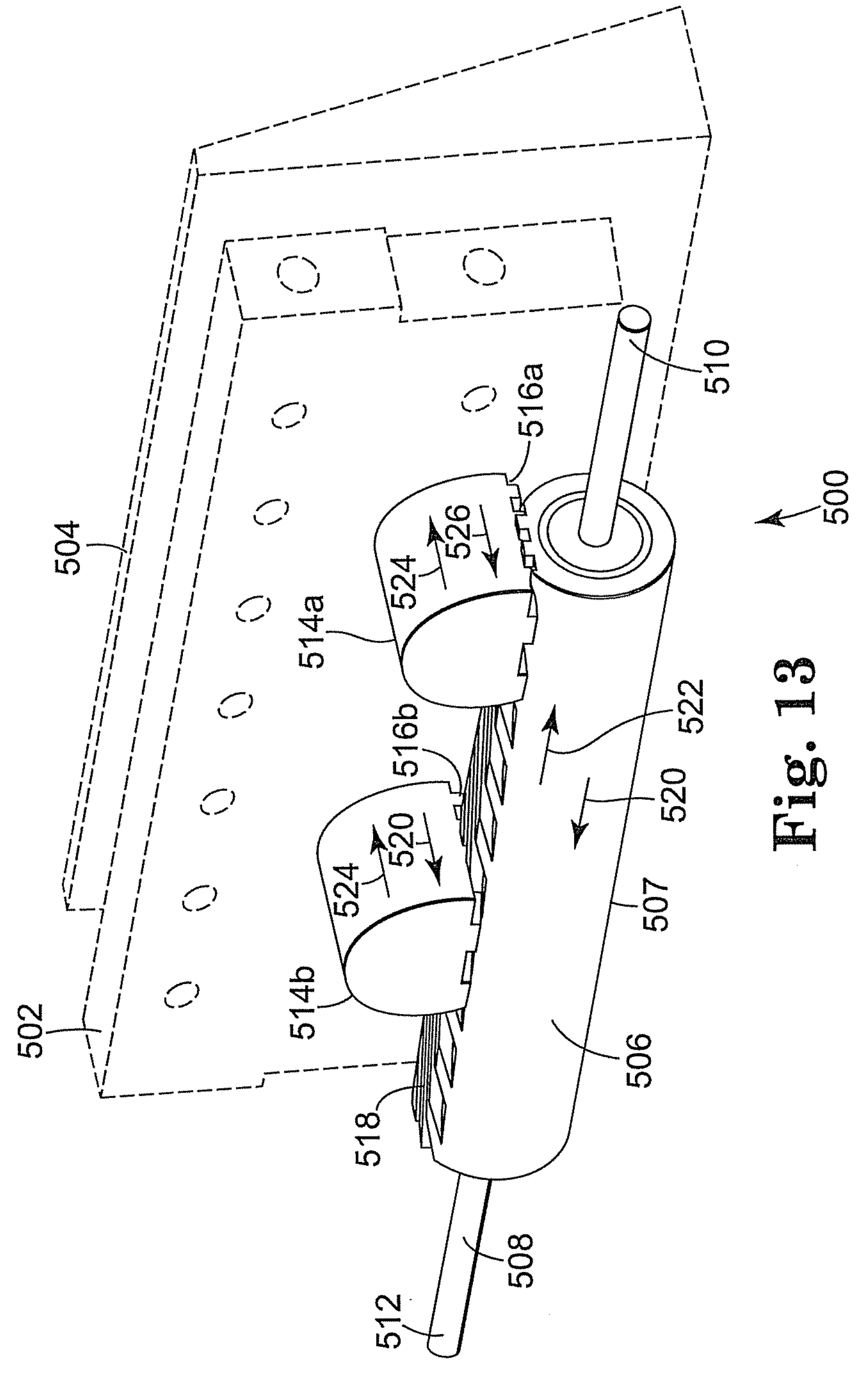
FIG. 13 is a perspective view illustrating one exemplary embodiment of a gear drive assembly according to the present invention.

FIG. 13 is a perspective view illustrating a gear drive assembly 500 according to the present invention, and a corresponding moveable liner plate 502 and removable liner face 504. For illustrative purposes, a frame assembly including side members and cross members is not shown. Gear drive assembly 500 includes double rod-end, dual-acting pneumatic cylinder-piston 506 having a cylinder body 507, and a hollow piston rod 508 with a first rod-end 510 and a second rod-end 512. Gear drive assembly 500 further includes a pair of first gear elements 514*a* and 514*b* selectively coupled to moveable liner plate 502, with each first gear element 514*a* and 514*b* having a plurality of substantially parallel angled channels 516*a* and 516*b*.

In the illustrated embodiment, cylinder body 507 of cylinder-piston 506 includes a plurality of substantially parallel angled channels 518 configured to mesh and slidably interlock with angled channels 516*a* and 516*b*. In one embodiment, cylinder body 507 is configured to slidably insert into and couple to a cylinder sleeve having angled channels 518.

In one embodiment, cylinder-piston 506 and piston rod 508 are located within a drive shaft of a frame member, such as drive shaft 134 of cross-member 36*a*, with rod-end 510 coupled to and extending through a frame member, such as side member 34*b*, and second rod-end 512 coupled to and extending through a frame member, such a side member 34*a*. First rod-end 510 and second rod-end 512 are configured to receive and provide compressed air to drive dual-acting cylinder-piston 506. With piston rod 508 being fixed to side members 34*a* and 34*b* via first and second rod-ends 512 and 510, cylinder-piston 506 travels along the axis of piston rod 508 in the directions as indicated by arrows 520 and 522 in response to compressed air received via first and second rod-ends 510 and 512.

When compressed air is received via second rod-end 512 and expelled via first rod-end 510, cylinder-piston 506 moves within a drive shaft, such as drive shaft 134, in direction 522 and causes first gear elements 514*a* and 516*b* and corresponding liner plate 502 and liner face 504 to move in a direction indicated by arrow 524. Conversely, when compressed air is received via first rod-end 510 and expelled via second rod-end 512, cylinder-piston 506 moves within a gear shaft, such as gear shaft 134, in direction 520 and causes first gear elements 514*a* and 516*b* and corresponding liner plate 502 and liner face 504 to move in a direction indicated by arrow 526.

In the illustrated embodiment, cylinder-piston 506 and first gear elements 514*a* and 514*b* are shown as being substantially cylindrical in shape. However, any suitable shape can be employed. Furthermore, in the illustrated embodiment, cylinder-piston 506 is a double rod-end dual-acting cylinder. In one embodiment, cylinder piston 506 is a single rod-end dual acting cylinder having only a single rod-end 510 coupled to a frame member, such as side member 34*b*. In such an embodiment, compressed air is provided to cylinder-piston via single rod-end 510 and a flexible pneumatic connection made to cylinder-piston 506 through side member 34*a* via gear shaft 134. Additionally, cylinder-piston 506 comprises a hydraulic cylinder.

Figure 14:
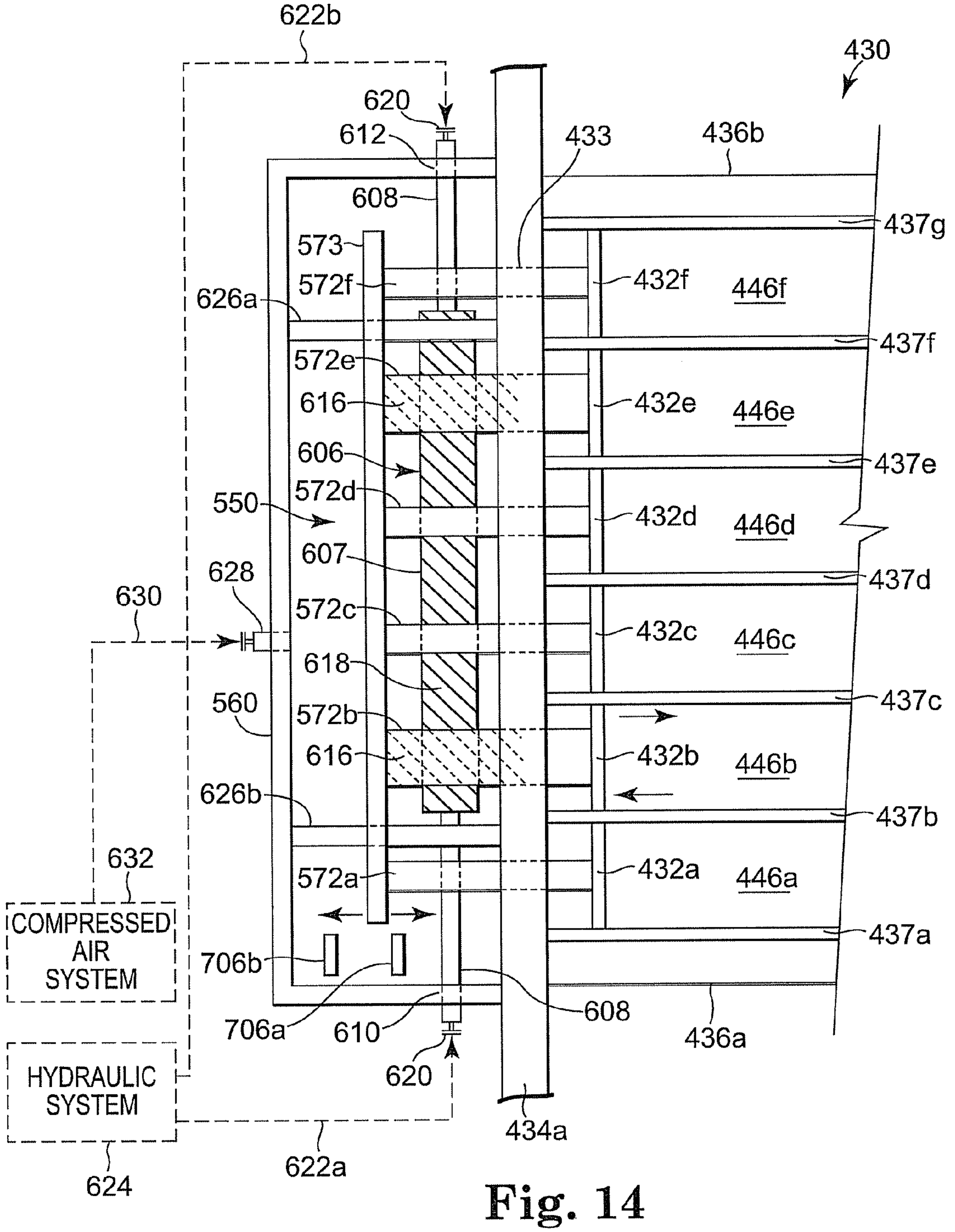
FIG. 14 is a top view illustrating a portion of one exemplary embodiment of a mold assembly and gear drive assembly according to the present invention.

FIG. 14 is a top view of a portion of mold assembly 430 (as illustrated by FIG. 12) having a drive assembly 550 according to one embodiment of the present invention. Drive assembly 550 includes first drive elements 572*a* to 572*f* that are selectively coupled to corresponding liner plates 432*a* to 432*f* via openings, such as opening 433, in side member 434*a*. Each of the first drive elements 572*a* to 572 if further coupled to a master bar 573. Drive assembly 550 further includes a double-rod-end hydraulic piston assembly 606 having a dual-acting cylinder 607 and a hollow piston rod 608 having a first rod-end 610 and a second rod-end 612. First and second rod-ends 610, 612 are stationary and are coupled to and extend through a removable housing 560 that is coupled to side member 434*a* and encloses drive assembly 550. First and second rod ends 610, 612 are each coupled to hydraulic fittings 620 that are configured to connect via lines 622*a* and 622*b* to an external hydraulic system 624 and to transfer hydraulic fluid to and from dual-acting cylinder 607 via hollow piston rod 608.

In one embodiment, as illustrated, first drive elements 572*b* and 572*e* include a plurality of substantially parallel angled channels 616 that slideably interlock with a plurality of substantially parallel angled channels 618 that form a second drive element. In one embodiment, as illustrated above by FIG. 12, angled channels 618 are formed on dual-acting cylinder 607 of hydraulic piston assembly 606, such that dual-acting cylinder 607 forms the second drive element. In other embodiments, as will be described by FIGS. 15A-15C below, the second drive element is separate from and operatively coupled to dual-acting cylinder 607.

When hydraulic fluid is transmitted into dual-acting cylinder 607 from second rod-end 612 via fitting 620 and hollow piston rod 608, hydraulic fluid is expelled from first rod-end 610, causing dual-acting cylinder 607 and angled channels 618 to move along piston rod 608 toward second rod-end 612. As dual-acting cylinder 607 moves toward second rod-end 612, angled channels 618 interact with angled channels 616 and drive first drive elements 572*b* and 572*e*, and thus corresponding liner plates 432*b* and 432*e*, toward the interior of mold cavities 446*b* and 446*e*, respectively. Furthermore, since each of the first drive elements 572*a* through 572*f* is coupled to master bar 573, driving first gear elements 572*b* and 572*e* toward the interiors of mold cavities 446*b* and 446*e* also moves first drive elements 572*a*, 572*c*, 572*d*, and 572*f* and corresponding liner plates 432*a*, 432*c*, 432*d*, and 432*e* toward the interiors of mold cavities 446*a*, 446*c*, 446*d*, and 446*f*, respectively. Conversely, transmitting hydraulic fluid into dual-acting cylinder 607 from first rod-end 610 via fitting 620 and hollow-piston rod 608 causes dual-acting cylinder 607 to move toward first rod-end 610, and causes liner plates 432 to move away from the interiors of corresponding mold cavities 446.

In one embodiment, drive assembly 550 further includes support shafts 626, such as support shafts 626*a* and 626*b*, which are coupled between removable housing 560 and side member 434*a* and extend through master bar 573. As dual-acting cylinder 607 is moved by transmitting/expelling hydraulic fluid from first and second rod-ends 610, 612, master bar 573 moves back and forth along support shafts 626. Because they are coupled to static elements of mold assembly 430, support shafts 626*a* and 626*b* provide support and rigidity to liner plates 432, drive elements 572, and master bar 573 as they move toward and away from mold cavities 446.

In one embodiment, drive assembly 550 further includes a pneumatic fitting 628 configured to connect via line 630 to and external compressed air system 632 and provide compressed air to housing 560. By receiving compressed air via pneumatic fitting 628 to removable housing 560, the internal air pressure of housing 560 is positive relative to the outside air pressure, such that air is continuously "forced" out of housing 560 through any non-sealed openings, such as openings 433 through which first drive elements 572 extend through side member 434*a*. By maintaining a positive air pressure and forcing air out through such non-sealed opening, the occurrence of dust and debris and other unwanted contaminants from entering housing 560 and fouling drive assembly 550 is reduced.

First and second rod ends 610, 612 are each coupled to hydraulic fittings 620 that are configured to connect via lines 622*a* and 622*b* to an external hydraulic system 624 and to transfer hydraulic fluid to and from dual-acting cylinder 607 via hollow piston rod 608.

Figure 15A:
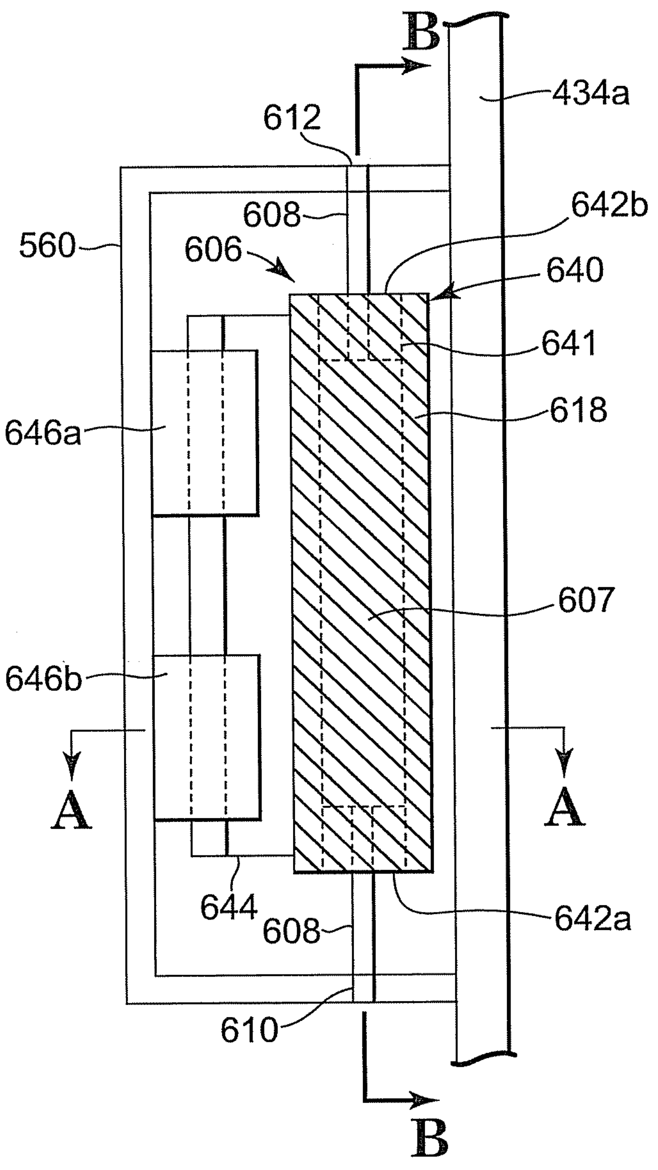
FIG. 15A is a top view illustrating a portion of one exemplary embodiment of a gear drive assembly employing a stabilizer assembly.

FIG. 15A is a top view illustrating a portion of one embodiment of drive assembly 550 according to the present invention. Drive assembly 550 includes double-rod-end hydraulic piston assembly 606 comprising dual-acting cylinder 607 and a hollow piston rod 608 with first and second rod-ends 610 and 612 being and coupled to and extending through removable housing 560.

As illustrated, dual-acting cylinder 607 is slideably-fitted inside a machined opening 641 within a second gear element 640, with hollow piston rod 608 extending through removable end caps 642. In one embodiment, end caps 646 are threadably inserted into machined opening 641 such that end caps 646 butt against and secure dual-acting cylinder 607 so that dual-acting cylinder 607 is held stationary with respect to second drive element 640. Second drive element 640 includes the plurality of substantially parallel angled channels 618, in lieu of angled channels being an integral part of dual-acting cylinder 607. With reference to FIG. 14, angled channels 618 of second gear element 640 are configured to slideably interlock with angled channels 616 of first gear elements 572*b* and 572*e*.

Second gear element 640 further includes a guide rail 644 that is slideably coupled to linear bearing blocks 646 that are mounted to housing 560. As described above with respect to FIG. 14, transmitting and expelling hydraulic fluid to and from dual-acting cylinder 607 via first and second rod-ends 610, 612 causes dual-acting cylinder 607 to move along hollow piston-rod 608. Since dual-acting cylinder 607 is "locked" in place within machined shaft 641 of second gear element 640 by end caps 642, second gear element 640 moves along hollow piston-rod 608 together with dual-acting cylinder 607. As second drive element 640 moves along hollow piston-rod 608, linear bearing blocks 646 guide and secure guide rail 644, thereby guiding and securing second drive element 640 and reducing undesirable motion in second drive element 640 that is perpendicular to hollow piston rod 608.

Figure 15B:
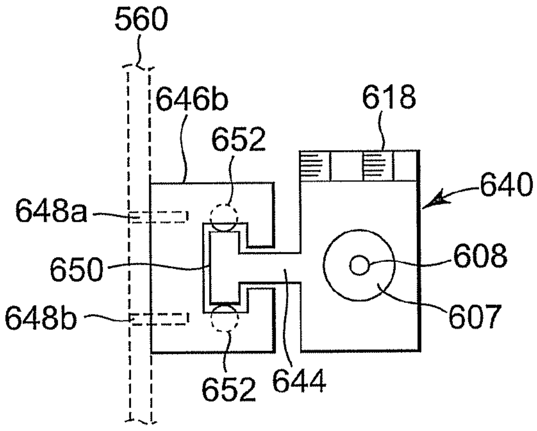
FIG. 15B is a cross-sectional view of the gear drive assembly of FIG. 15A.

FIG. 15B is a lateral cross-sectional view A-A of the portion of drive assembly 550 illustrated by FIG. 15A. Guide rail 644 is slideably fitted into a linear bearing track 650 and rides on bearings 652 as second drive element 640 is moved along piston rod 608 by dual-acting cylinder 607. In one embodiment, linear bearing block 646*b* is coupled to housing 560 via bolts 648.

Figure 15C:
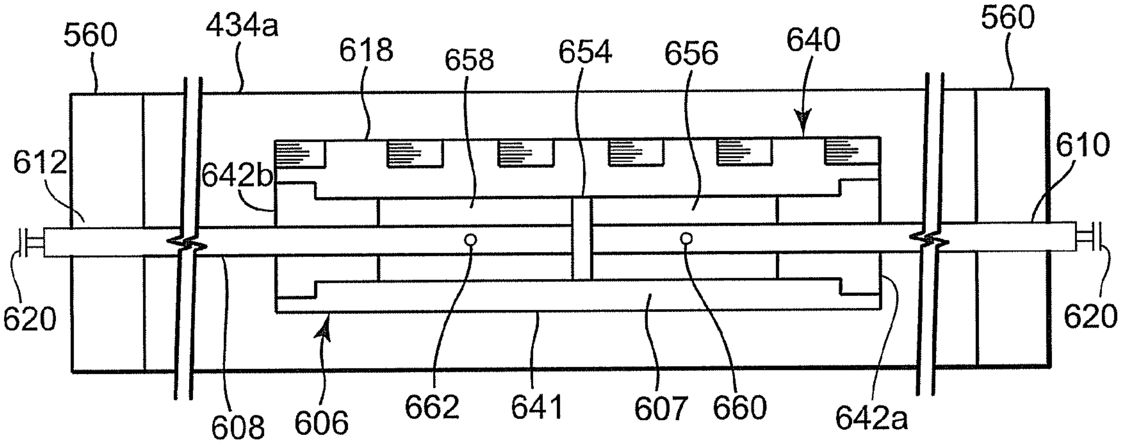
FIG. 15C is a cross-sectional view of the gear drive assembly of FIG. 15A.

FIG. 15C is a longitudinal cross-sectional view B-B of the portion of drive assembly 550 of FIG. 15A, and illustrates dual-acting cylinder 607 as being secured within shaft 641 of drive element 640 by end caps 642*a* and 642*b*. In one embodiment, end caps 642*a* and 642*b* are threadably inserted into the ends of second drive element 640 so as to butt against each end of dual-acting cylinder 607. Hollow piston rod 608 extends through end caps 642*a* and 642*b* and has first and second rod ends 610 and 612 coupled to and extending through housing 560. A divider 654 is coupled to piston rod 608 and divides dual-acting cylinder 607 into a first chamber 656 and a second chamber 658. A first port 660 and a second port 662 allow hydraulic fluid to be pumped into and expelled from first chamber 656 and second chamber 658 via first and second rod ends 610 and 612 and associated hydraulic fittings 620, respectively.

When hydraulic fluid is pumped into first chamber 656 via first rod-end 610 and first port 660, dual-acting cylinder 607 moves along hollow piston rod 608 toward first rod-end 610 and hydraulic fluid is expelled from second chamber 658 via second port 662 and second rod-end 612. Since dual-acting cylinder 607 is secured within shaft 641 by end caps 642*a* and 642*b*, second drive element 640 and, thus, angled channels 618 move toward first rod-end 610. Similarly, when hydraulic fluid is pumped into second chamber 658 via second rod-end 612 and second port 662, dual-acting cylinder 607 moves along hollow piston rod 608 toward second rod-end 612 and hydraulic fluid is expelled from first chamber 656 via first port 660 and first rod-end 610.

Figure 16:
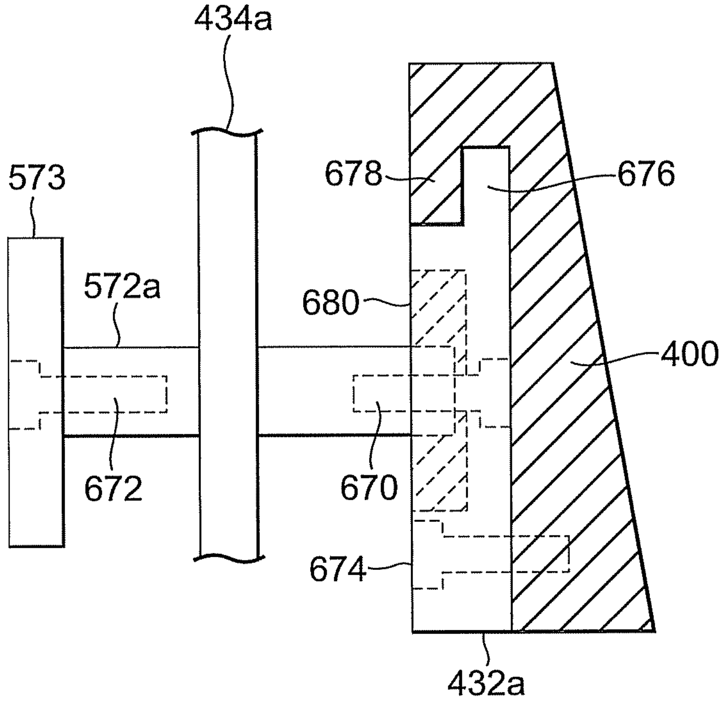
FIG. 16 is a side view illustrating a portion of one exemplary embodiment of a gear drive assembly and moveable liner plate according to the present invention.

FIG. 16 is a side view of a portion of drive assembly 550 as shown by FIG. 14 and illustrates a typical liner plate, such as liner plate 432*a*, and corresponding removable liner face 400. Liner plate 432*a* is coupled to second drive element 572*a* via a bolted connection 670 and, in-turn, drive element 572*a* is coupled to master bar 573 via a bolted connection 672. A lower portion of liner face 400 is coupled to liner plate 432*a* via a bolted connection 674. In one embodiment, as illustrated, liner plate 432*a* includes a raised "rib" 676 that runs the length of and along an upper edge of liner plate 432*a*. A channel 678 in liner face 400 overlaps and interlocks with raised rib 676 to form a "boltless" connection between liner plate 432*a* and an upper portion of liner face 400. Such an interlocking connection securely couples the upper portion of liner face 400 to liner plate 432 in an area of liner face 400 that would otherwise be too narrow to allow use of a bolted connection between liner face 400 and liner plate 432*a* without the bolt being visible on the surface of liner face 400 that faces mold cavity 446*a*.

In one embodiment, liner plate 432 includes a heater 680 configured to maintain the temperature of corresponding liner face 400 at a desired temperature to prevent concrete in corresponding mold cavity 446 sticking to a surface of liner face 400 during a concrete curing process. In one embodiment, heater 680 comprises an electric heater.

Figure 17:
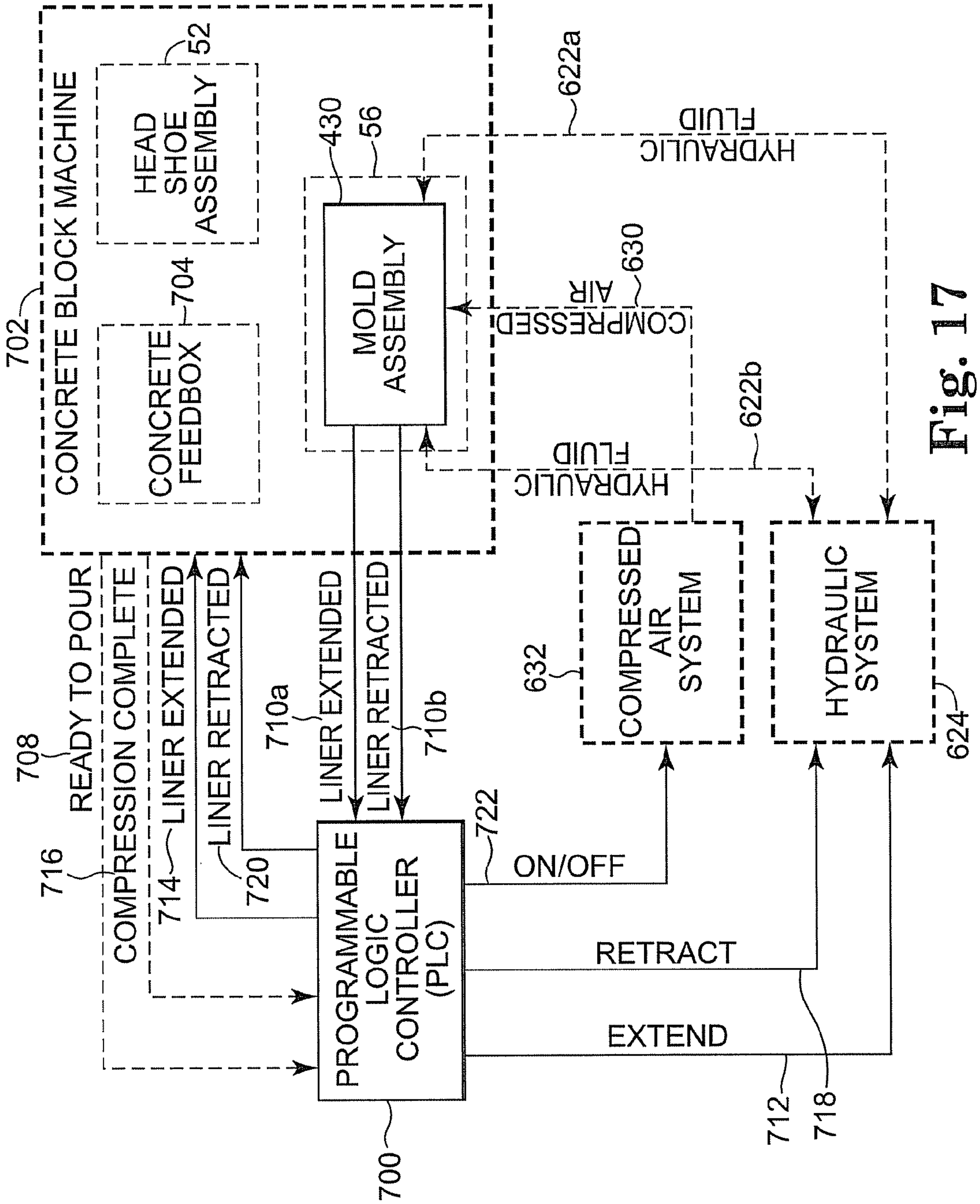
FIG. 17 is a block diagram illustrating one exemplary embodiment of a mold assembly employing a control system according to the present invention.

FIG. 17 is a block diagram illustrating one embodiment of a mold assembly according to the present invention, such as mold assembly 430 of FIG. 14, further including a controller 700 configured to coordinate the movement of moveable liner plates, such as liner plates 432, with operations of concrete block machine 702 by controlling the operation of the drive assembly, such as drive assembly 550. In one embodiment, as illustrated, controller 700 comprises a programmable logic controller (PLC).

As described above with respect to FIG. 1, mold assembly 430 is selectively coupled, generally via a plurality of bolted connections, to concrete block machine 702. In operation, concrete block machine 702 first places pallet 56 below mold box assembly 430. A concrete feedbox 704 then fills mold cavities, such as mold cavities 446, of assembly 430 with concrete. Head shoe assembly 52 is then lowered onto mold assembly 430 and hydraulically or mechanically compresses the concrete in mold cavities 446 and, together with a vibrating table on which pallet 56 is positioned, simultaneously vibrates mold assembly 430. After the compression and vibration is complete, head shoe assembly 52 and pallet 56 are lowered relative to mold cavities 446 so that the formed concrete blocks are expelled from mold cavities 446 onto pallet 56. Head shoe assembly 52 is then raised and a new pallet 56 is moved into position below mold cavities 446. The above process is continuously repeated, with each such repetition commonly referred to as a cycle. With specific reference to mold assembly 430, each such cycle produces six concrete blocks.

PLC 700 is configured to coordinate the extension and retraction of liner plates 432 into and out of mold cavities 446 with the operations of concrete block machine 702 as described above. At the start of a cycle, liner plates 432 are fully retracted from mold cavities 446. In one embodiment, with reference to FIG. 14, drive assembly 550 includes a pair of sensors, such as proximity switches 706*a* and 706*b* to monitor the position of master bar 573 and, thus, the positions of corresponding moveable liner plates 432 coupled to master bar 573. As illustrated in FIG. 14, proximity switches 706*a* and 706*b* are respectively configured to detect when liner plates 432 are in an extended position and a retracted position with respect to mold cavities 446.

In one embodiment, after pallet 56 has been positioned beneath mold assembly 430, PLC 700 receives a signal 708 from concrete block machine 702 indicating that concrete feedbox 704 is ready to deliver concrete to mold cavities 446. PLC 700 checks the position of moveable liners 432 based on signals 710*a* and 710*b* received respectively from proximity switches 706*a* and 706*b*. With liner plates 432 in a retracted position, PLC 700 provides a liner extension signal 712 to hydraulic system 624.

In response to liner extension signal 712, hydraulic system 624 begins pumping hydraulic fluid via path 622*b* to second rod-end 612 of piston assembly 606 and begins receiving hydraulic fluid from first rod-end 610 via path 622*a*, thereby causing dual-acting cylinder 607 to begin moving liner plates 432 toward the interiors of mold cavities 446. When proximity switch 706*a* detects master bar 573, proximity switch 706*a* provides signal 710*a* to PLC 700 indicating that liner plates 432 have reached the desired extended position. In response to signal 710*a*, PLC 700 instructs hydraulic system 624 via signal 712 to stop pumping hydraulic fluid to piston assembly 606 and provides a signal 714 to concrete block machine 702 indicating that liner plates 432 are extended.

In response to signal 714, concrete feedbox 704 fills mold cavities 446 with concrete and head shoe assembly 52 is lowered onto mold assembly 430. After the compression and vibrating of the concrete is complete, concrete block machine 702 provides a signal 716 indicating that the formed concrete blocks are ready to be expelled from mold cavities 446. In response to signal 716, PLC 700 provides a liner retraction signal 718 to hydraulic system 624.

In response to liner retraction signal 718, hydraulic system 624 begins pumping hydraulic fluid via path 622*a* to first rod-end 610 via path 622 and begins receiving hydraulic fluid via path 622*b* from second rod-end 612, thereby causing dual-acting cylinder 607 to begin moving liner plates 432 away from the interiors of mold cavities 446. When proximity switch 706*b* detects master bar 573, proximity switch 706*b* provides signal 710*b* to PLC 700 indicating that liner plates 432 have reached a desired retracted position. In response to signal 710*b*, PLC 700 instructs hydraulic system 624 via signal 718 to stop pumping hydraulic fluid to piston assembly 606 and provides a signal 720 to concrete block machine 702 indicating that liner plates 432 are retracted.

In response to signal 720, head shoe assembly 52 and pallet 56 eject the formed concrete blocks from mold cavities 446. Concrete block machine 702 then retracts head shoe assembly 52 and positions a new pallet 56 below mold assembly 430. The above process is then repeated for the next cycle.

In one embodiment, PLC 700 is further configured to control the supply of compressed air to mold assembly 430. In one embodiment, PLC 700 provides a status signal 722 to compressed air system 630 indicative of when concrete block machine 702 and mold assembly 430 are in operation and forming concrete blocks. When in operation, compressed air system 632 provides compressed air via line 630 and pneumatic fitting 628 to housing 560 of mold assembly 420 to reduce the potential for dirt/dust and other debris from entering drive assembly 550. When not in operation, compressed air system 632 does not provide compressed air to mold assembly 430.

Although the above description of controller 700 is in regard to controlling a drive assembly employing only a single piston assembly, such as piston assembly 606 of drive assembly 500, controller 700 can be adapted to control drive assemblies employing multiple piston assemblies and employing multiple pairs of proximity switches, such as proximity switches 706*a* and 706*b*. In such instances, hydraulic system 624 would be coupled to each piston assembly via a pair of hydraulic lines, such as lines 622*a* and 622*b*. Additionally, PLC 700 would receive multiple position signals and would respectively allow mold cavities to be filled with concrete and formed blocks to be ejected only when each applicable proximity switch indicates that all moveable liner plates are at their extended position and each applicable proximity switch indicates that all moveable liner plates are at their retracted position.

Figure 18:
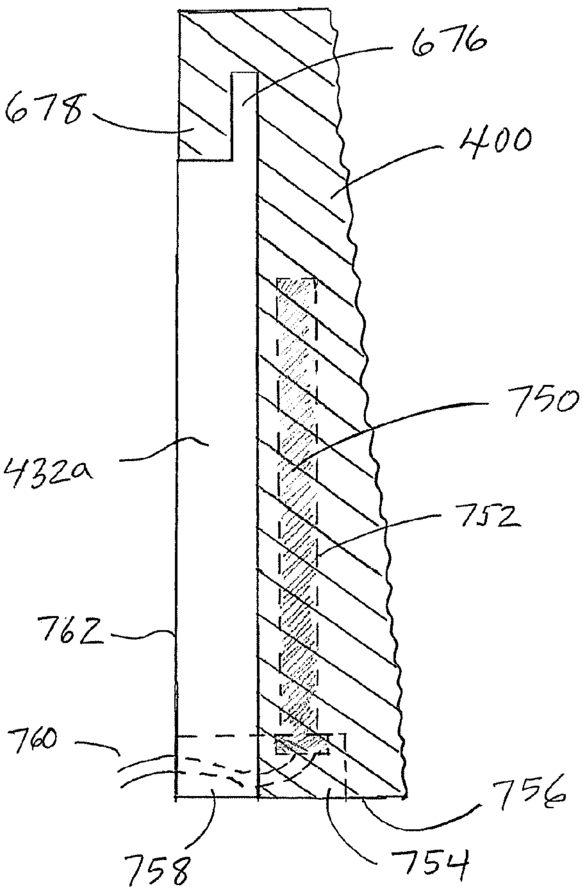
FIG. 18 is a side view illustrating a moveable liner plate according to one embodiment.

FIG. 18 is a side view illustrating one embodiment of a moveable liner plate, similar to moveable liner plate 432*a* of FIG. 16, but with removable liner face 400 further including an integral heater element 750 slideably positioned within a cavity or hollow shaft 752 within removable liner face 400, with integral heater element 750 configured to maintain removable liner face 400 at a desired temperature to prevent concrete in corresponding mold cavity 446*a* from sticking to a surface of liner face 400 during a block making process.

According to one embodiment, hollow shaft 752 is cylindrical in shape. According to one embodiment, hollow shaft 752 has dimensions incrementally larger than corresponding dimensions of heater element 750 so that heater element 750 slideably inserts and fits tightly within hollow shaft 752. In one embodiment, heater element 750 and hollow shaft 752 are centrally positioned within removable liner face 400. According to one embodiment, removable liner face 400 includes a plurality of hollow shafts 752 and heater elements 750, one heater element positioned with each of the hollow shafts 752.

In one embodiment, a notch 754 enables heater element 750 to be recessed within and away from a bottom surface 756 of removable liner face 400, thereby protecting heater element 750 during movement of moveable liner plate 432*a* and removable liner face 400 within a mold cavity, such as mold cavity 446*a* (see FIG. 14) According to one embodiment, heater element 750 comprises an electrical heater element, and notch 754 in removable liner face 400, together with an opening or notch 758 in moveable liner plate 432*a*, provide a path for electrical leads 760 of heater element 750 to exit from a backside 762 of moveable liner plate 432*a*.

Figure 19:
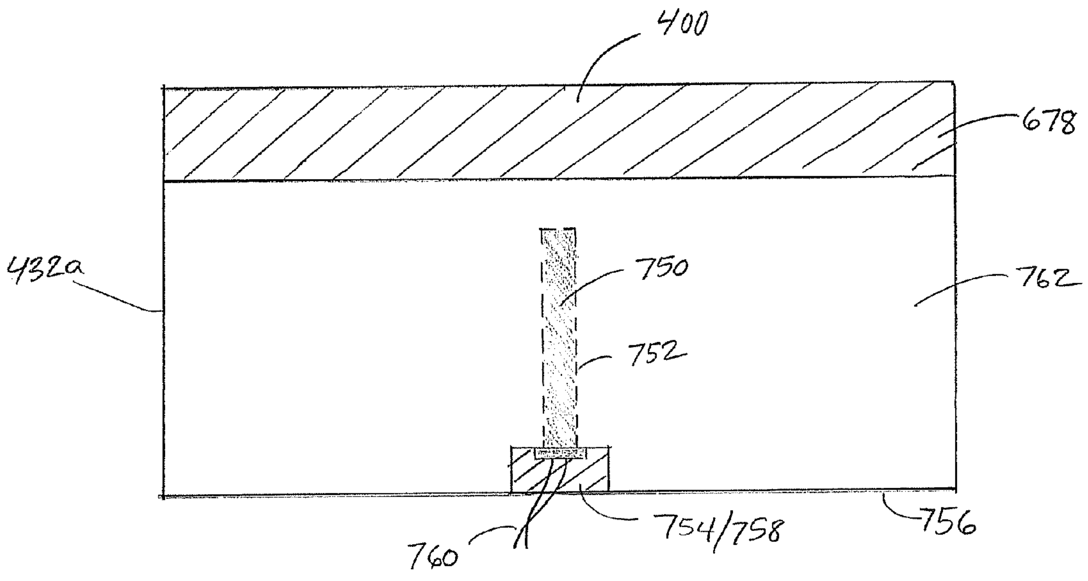
FIG. 19 is a rear view illustrating one embodiment of the moveable liner plate of FIG. 18.
Figure 20:
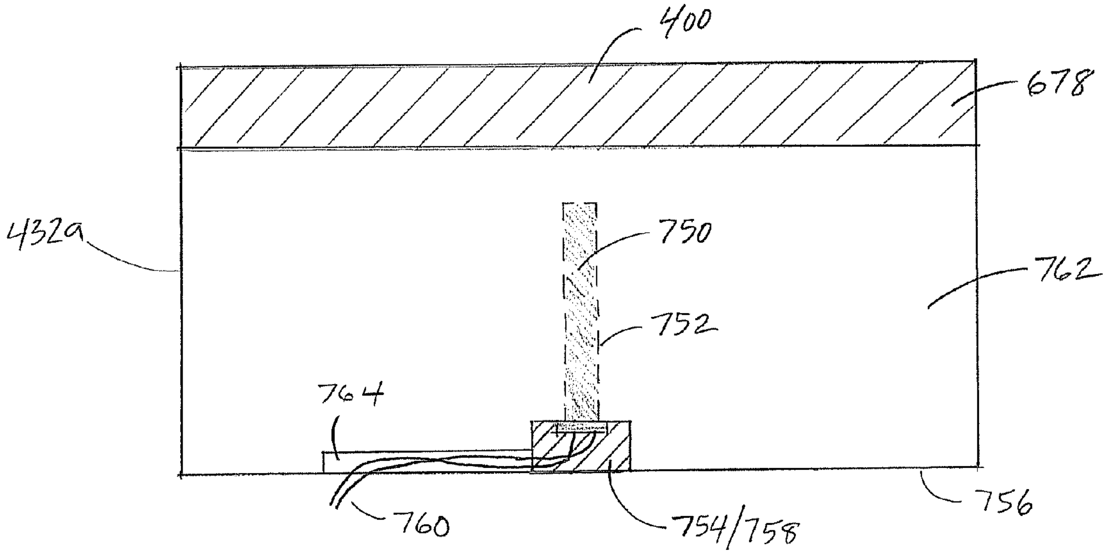
FIG. 20 is a rear view illustrating one embodiment of the moveable liner plate of FIG. 18.

FIGS. 19 and 20 illustrate backside views of moveable liner plate 432*a* and removable liner face 400 of FIG. 18. According to one embodiment, as illustrated by FIG. 20, moveable liner plate 432*a* further includes a channel 764 in and along backside 762 in which electrical leads 760 may be routed, such as to a more desirable location from which to exit mold assembly 430 (see FIG. 14).

Although described above as extending from a bottom surface 756 of removable liner face 400, it is noted that hollow shaft 756 can extend from any edge of removable liner face 400, such as the side and top edges for example. Additionally, although illustrated as a cylindrical cartridge style heater, heater element 750 may comprise any number of shapes and sizes, with the shape and size of hollow shaft 756 being modified accordingly. Furthermore, heater element 750 need not be positioned internal to, but in contact with removable liner face 100.

Figure 21:
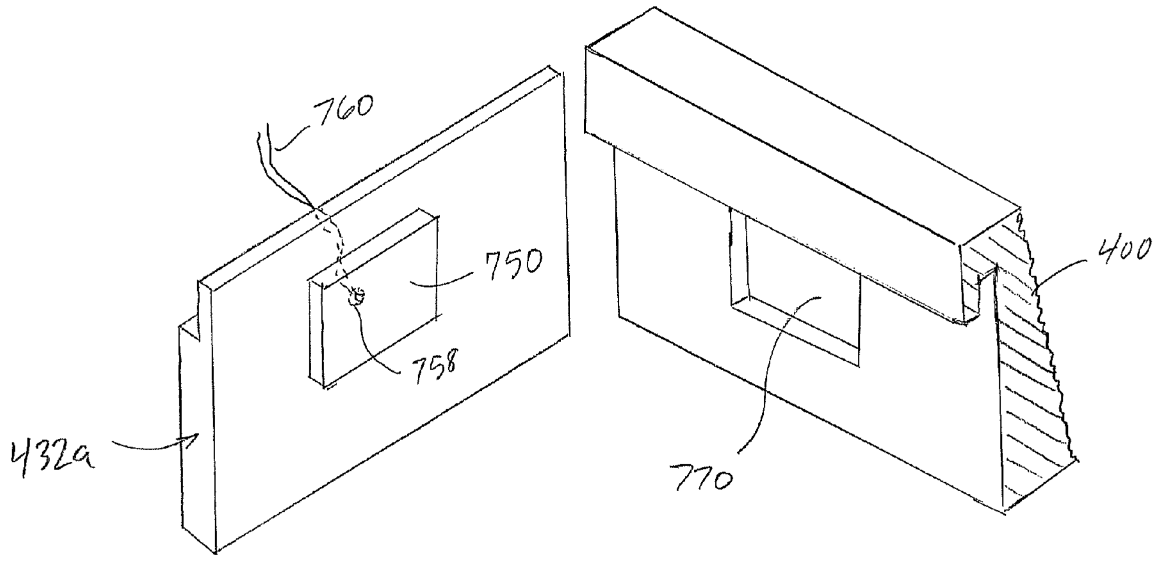
FIG. 21 is a perspective view illustrating a moveable liner plate according to one embodiment.

FIG. 21 is a perspective view illustrating another embodiment of moveable liner plate 432*a*, wherein heater element 750, illustrated as being rectangular shape, is mounted to a front surface of moveable liner plate 432*a*. According to one embodiment, opening 758 is provided from the front surface to the rear surface of moveable liner plate 432*a* through which electrical leads 760 of heater element 750 extend. In lieu of hollow shaft 752, as illustrated by FIGS. 18-20, removable liner face 400 includes a cavity 770 in the rear surface into which heater element 750 inserts when removable liner face 400 is mounted to moveable liner plate 432*a*. According to one embodiment, cavity 770 has dimensions incrementally larger than those of heater element 750 so that heater element 750 fits snugly within cavity 770 and contacts the material of removable liner face 400 (e.g. steel). By being in direct contact with removable liner face 400, heater element 750 is better able to heat and maintain a front, textured surface of removable liner face 400 at a desired temperature during operation. Also, by mounting heater element 750 to movable liner plate 432*a*, liner plates 432*a* having differently textured front surfaces can be quickly mounted/dismounted from moveable liner plate 432*a* without having to reconnect/reinstall heater element 750, as required by the configuration of FIG. 18.

Figure 22:
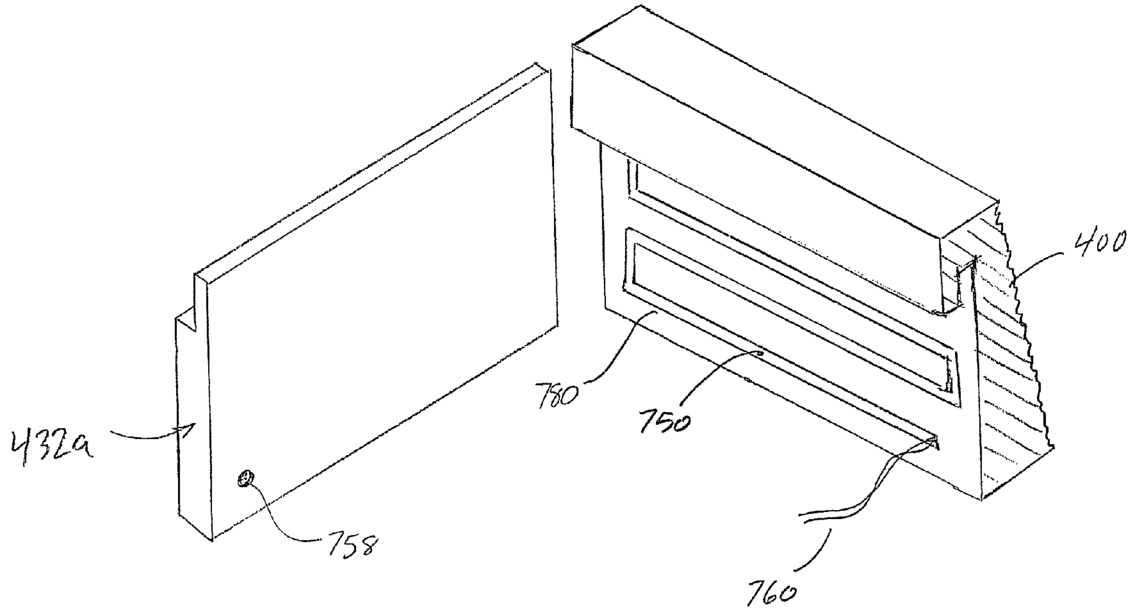
FIG. 22 is a perspective view illustrating a moveable liner plate according to one embodiment.

FIG. 22 is a perspective view illustrating removable liner face 400 according to another embodiment, wherein heater element 750 comprises a flexible cord-type heater which is inserted within a continuous channel 780 running in back-and-forth or zigzag type fashion across the rear surface of removable liner face 400. Similar to that of cavity 770, the dimensions of channel 780 are incrementally larger than those of heater element cord-type heater element 750 so that heater element 750 fits snugly within channel 780 and contacts the material of removable liner face 400 (e.g. steel). According to one embodiment, opening 758 is provided from the front surface to the rear surface of moveable liner plate 432*a* through which electrical leads 760 of heater element 750 extend when removable liner face 400 is installed on moveable liner face 432*a*.

It is noted that, although illustrated primarily with respect to moveable liner plates and removable liner faces selectively coupled thereto, heater elements may also be positioned on the rear surfaces of, or internal to, stationary or non-moveable liner plates such as division plates 437*a* through 437*g*, all illustrated by mold assembly 430 of FIG. 12.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A mold assembly comprising:

a mold cavity formed by a plurality of liner plates, wherein at least one of the liner plates is moveable toward and away from an interior of the mold cavity, the moveable liner plate having a first major surface facing the interior of the mold cavity and a second major surface opposite the first major surface; and a heater element contacting and heating the moveable liner plate.

2. The mold assembly of claim 1, wherein the heater element contacts the second major surface.

3. The mold assembly of claim 2, wherein the at least one heater element is mounted in a recess in the second major surface.

4. The mold assembly of claim 2, wherein the at least one heater element is centrally positioned on the second major surface.

5. The mold assembly of claim 1, wherein the heater element comprises and electric heater.

6. The mold assembly of claim 1, further including a removable liner face selectively coupled to the first major surface, wherein the heater element is configured to heat the removable liner face.

7. The mold assembly of claim 6, wherein the heater element is positioned between the moveable liner plate and the removable liner face.

8. The mold assembly of claim 7, wherein the heater element is mounted to the first major surface of the moveable liner plate and positioned within a cavity of the removable liner face when the removable liner face is mounted to the moveable liner plate.

9. The mold assembly of claim 1, wherein the heater moves with the moveable liner plate.

10. The mold assembly of claim 1, wherein the mold assembly is configured for use in an automated dry cast block machine.

11. A mold for forming dry cast masonry blocks in an automated dry cast block machine, the mold assembly comprising:

a plurality liner plates which together form a mold cavity, wherein at least one of the liner plates is moveable between an extended position toward an interior of the mold cavity and a retracted position away from the interior of the mold cavity, the moveable liner plate having a first major surface facing the interior of the mold cavity and an opposing second major surface;

a removable liner face selectively coupled to the first major surface and having a negative of a desired texture to be imprinted on a surface of a dry cast masonry block formed in the mold cavity; and a heater contacting the moveable liner plate and configured to heat the removable liner face to a desired temperature.

12. The mold of claim 11, wherein the heater is mounted to the first major surface so as to be disposed between the first major surface and the removable liner and moves with the moveable liner plate and removable liner face toward and away from the interior of the mold cavity.

13. The mold of claim 12, wherein the heater is disposed within a cavity in the removable liner face.

14. The mold of claim 12, wherein the heater comprises and electric heater element.

15. The mold of claim 12, wherein the heater is mounted to the second major surface of the moveable liner plate.

16. The mold assembly of claim 12, including one or more heaters contacting and heating liner plates of the plurality of liner plates other than the at least one moveable liner plate.

* * * * *